(12) United States Patent
Karni et al.

(10) Patent No.: US 12,122,532 B2
(45) Date of Patent: Oct. 22, 2024

(54) VOLUMETRICALLY EFFICIENT CARGO AIRCRAFT

(71) Applicant: ZSM HOLDINGS LLC, Dover, DE (US)

(72) Inventors: Etan D. Karni, Boulder, CO (US); Mark Emil Lundstrom, Boulder, CO (US)

(73) Assignee: ZSM Holdings, LLC, Dover, DE (US)

( * ) Notice: Subject to any disclaimer, the term of this patent is extended or adjusted under 35 U.S.C. 154(b) by 86 days.

(21) Appl. No.: 17/640,508

(22) PCT Filed: Sep. 8, 2020

(86) PCT No.: PCT/US2020/049785
§ 371 (c)(1),
(2) Date: Mar. 4, 2022

(87) PCT Pub. No.: WO2021/046558
PCT Pub. Date: Mar. 11, 2021

(65) Prior Publication Data
US 2022/0348330 A1    Nov. 3, 2022

Related U.S. Application Data

(60) Provisional application No. 62/896,530, filed on Sep. 5, 2019, provisional application No. 62/896,533, filed on Sep. 5, 2019.

(51) Int. Cl.
*B64D 9/00* (2006.01)
*B60P 3/40* (2006.01)
(Continued)

(52) U.S. Cl.
CPC ............... *B64D 9/00* (2013.01); *B60P 3/40* (2013.01); *B64C 1/1415* (2013.01); *B64C 1/22* (2013.01);
(Continued)

(58) Field of Classification Search
CPC ...... B64D 2009/006; B64D 9/00; B64C 1/22; B64C 1/1415; B60P 3/40
See application file for complete search history.

(56) References Cited

U.S. PATENT DOCUMENTS 3,335,981 A * 8/1967 Pauli .................. B64C 25/14
244/102 R
3,374,972 A * 3/1968 Webb, Sr. ............. B64C 1/1415
49/362

(Continued)

FOREIGN PATENT DOCUMENTS

CN    207697983 U    8/2018
RU    2666021 C1     9/2018

OTHER PUBLICATIONS

LM Wind Power, Online Publication date Feb. 1, 2012, URL: https://www/youtube.com/watch?=N5D29rqmMY, see pertinent portions of approximately 6 minute video cited throughout N0n-Final Rejection (Year: 2012).*
PCT International Search Report and Written Opinion completed by the ISA/US on Oct. 30, 2020 and issued in connection with PCT/US2020/049785.
(Continued)

*Primary Examiner* — Brady W Frazier
*Assistant Examiner* — Shanna Danielle Glover
(74) *Attorney, Agent, or Firm* — Barnes & Thornburg, LLP

(57) ABSTRACT

A cargo aircraft configured to carry a portion of its payload in a cargo bay volume enclosed by a moveable nose door and supported by a structural extension of the fuselage that extends forward into the moveable nose door is disclosed. Examples include an aircraft with a continuous cargo bay extending from an aft end of a fixed portion into forward portion inside a nose door, where the portion of the cargo bay in the nose door is supported by a cantilevered support (Continued)

structure extending forward a length from a cargo opening into the fixed portion and such that the support structure extends into the nose door when the door is closed. The length of the support structure defines a supported cargo volume of at least about 15% of the overall volume of the fuselage forward of an aft end of the support structure.

19 Claims, 24 Drawing Sheets

(51) Int. Cl.
  *B64C 1/14* (2006.01)
  *B64C 1/22* (2006.01)
  *F03D 13/40* (2016.01)
(52) U.S. Cl.
  CPC ........ *F03D 13/40* (2016.05); *B64D 2009/006* (2013.01)

(56) References Cited

U.S. PATENT DOCUMENTS

| | | | |
|---|---|---|---|
| 4,165,810 A * | 8/1979 | Young | B64C 1/22 |
| | | | 187/241 |
| 2020/0223529 A1 * | 7/2020 | Spry | B64C 1/20 |

OTHER PUBLICATIONS

No Author Listed. "Antonov Airlines" (antonov-airtines.com) Jul. 2019 (Jul. 2019) [online] retrieved from <URL:https://l,V\wi.antonov-airtlnes.com/wp-content/uploads/2019107/Antonov-Airlines-brochure.pdf>, entire document.

No Author Listed. "747-400/-400ER Freighters" (StartupBoeing) May 2010 (May 2010), entire document.

* cited by examiner

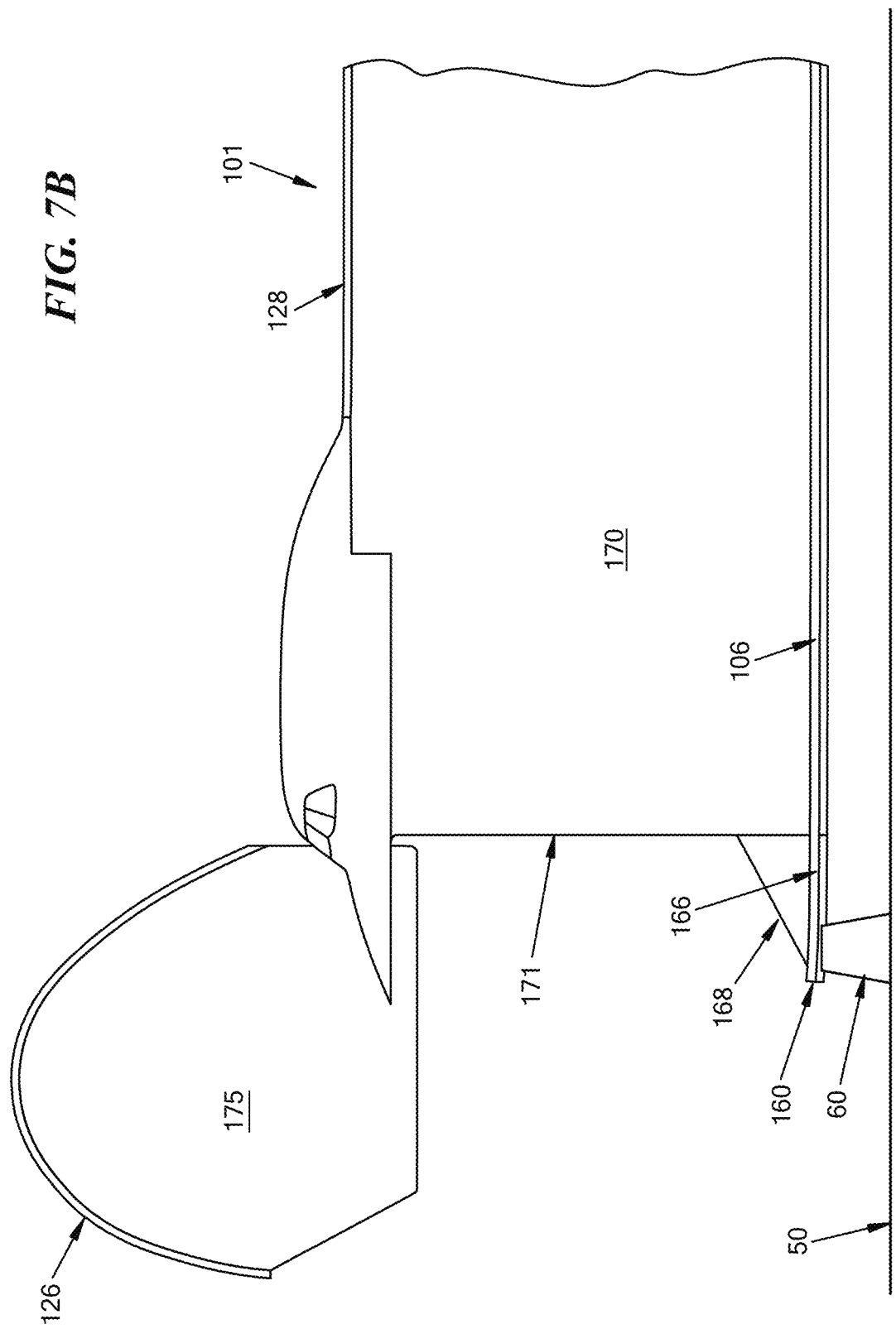

VOLUMETRICALLY EFFICIENT CARGO AIRCRAFT

CROSS-REFERENCE TO RELATED APPLICATIONS

This application is a U.S. national counterpart application of PCT International Application No. PCT/US2020/049785 filed Sep. 8, 2020, which claims priority to and the benefit of each of U.S. Provisional Application Ser. No. 62/896,530, filed Sep. 5, 2019, and entitled VOLUMETRICALLY EFFICIENT CARGO AIRCRAFT, and from U.S. Provisional Application Ser. No. 62/896,533, filed Sep. 5, 2019, and entitled METHODS FOR PACKAGING AND PLACING ELONGATED CARGOS WITHIN A VEHICLE. The disclosures of International Patent Application No. PCT/US2020/049785, U.S. Patent Application Ser. No. 62/896,530, and U.S. Patent Application Ser. No. 62/896,533 are expressly incorporated herein.

FIELD

The present disclosure relates to cargo aircraft that are configured to carry some portion of its payload in a cargo bay volume enclosed by a moveable nose door.

BACKGROUND

Renewable energy remains an increasingly important resource year-over-year. While there are many forms of renewable energy, wind energy has increased an average of about 19 percent annually since 2007. The increase in global demand in recent years for more wind energy has catalyzed drastic advances in wind turbine technology, including the development of larger, better-performing wind turbines. Better-performing wind turbines can at least sometimes mean larger turbines, as generally turbines with larger rotor diameters can capture more wind energy. As turbines continue to improve in performance and efficiency, more and more wind farm sites become viable both onshore and offshore. These sites may be existing sites, where older turbines need replacement by better-performing, more efficient turbines, and new sites.

A limiting factor to allow for the revitalization of old sites and development of new sites is transporting the wind turbines, and related equipment, to the sites. Wind turbine blades are difficult to transport long distances due to the terrestrial limitations of existing air vehicles and roadway infrastructures. Onshore transportation has traditionally required truck or rail transportation on existing infrastructure. Both are limited by height and width of tunnels and bridges. Road transport has additional complications of lane width, road curvature, and the need to pass through urban areas that may require additional permitting and logistics, among other complications. Offshore transportation by ship is equally, if not more so, limiting. For example, delivery of parts can be limited to how accessible the offshore location is by ship due to various barriers (e.g., sand bars, coral reefs) and the like in the water and surrounding areas, as well as the availability of ships capable of handling such large structures.

Whether onshore or offshore, the road vehicle or ship options for transporting such equipment has become more limited, particularly as the size of wind turbines increase. Delivery is thus limited by the availability of vehicles and ships capable of handling such large structures. The very long lengths of wind turbine blades (some are presently 90 meters long, 100 meters long, or even longer) make conventional transportation by train, truck, or ship very difficult and complicated. Unfortunately, the solution is not as simple as making transportation vehicles longer and/or larger. There are a variety of complications that present themselves as vehicles are made longer and/or larger, including but not limited to complications of: load balancing of the vehicle; load balancing the equipment being transported; load balancing the two with respect to each other; handling, maneuverability, and control of the vehicle; and other complications that would be apparent to those skilled in the art.

Further, whether onshore or offshore, delivery of parts can be slow and severely limited by the accessibility of the site. Whether the site being developed is old or new, the sites can often be remote, and thus not near suitable transportation infrastructure. The sites may be far away from suitable roads and rails (or other means by which cargo may be transported) to allow for easy delivery of cargo for use in building the turbines at the site and/or other equipment used in developing the site. New sites are often in areas without any existing transportation infrastructure at all, thus requiring new construction and special equipment. Ultimately, transportation logistics become cost prohibitive, resulting in a literal and figurative roadblock to further advancing the use of wind energy on a global scale.

Some existing cargo aircraft utilize moveable nose doors to access their cargo bays. While moveable ramps may be used for loading/unloading, the cargo is typically only secured for flight fully within a fixed portion of the fuselage. This method fails to maximally utilize the available internal volume within the moveable nose.

Accordingly, there is a need for cargo aircraft designs that extend the overall length of their cargo bay by utilizing a substantial portion of a volume of a moveable nose cargo.

SUMMARY

In contrast to existing cargo aircraft, the present disclosure describes an aircraft configuration that permits use of otherwise wasted volume enclosed by a moveable nose cargo door. A cargo aircraft configured in accordance with the present disclosure carries some portion of its payload in the volume enclosed by the moveable nose cargo door. The cargo is secured to the aircraft on a "tongue" structure, which transfers loads to the main airframe section. The tongue may be cantilevered or braced. As the cargo door opens, it clears the support structure on which the cargo rests.

The present disclosure is embodied in a cargo aircraft that carries some portion of its payload secured in the volume enclosed by a moveable cargo door, forward of the split between the door and fixed fuselage. Certain examples of the present disclosure include a cargo aircraft that carries some portion of its payload on a cantilevered support structure that extends forward into the volume enclosed by a moveable nose door, such that, as the nose door opens, it clears the support structure on which the cargo rests. The cargo can be secured to the aircraft on the cantilevered support structure which transfers loads to a main airframe section, such as a longitudinal support or keel beam structure. In some examples, the cantilevered support structure is a direct extension of the existing lower fuselage structure. In some examples, such as a braced configuration, the cantilevered support structure can support by auxiliary structure such as a gusset or diagonal strut in addition to or in replacement of being direct extension of the existing lower fuselage structure. In some instances, the aircraft is configured such that the cargo door and tongue geometries that do not clash as the door opens and the cargo door may be a single unit or one or more sub-doors, which swing vertically or to either side.

In one exemplary embodiment a cargo aircraft, includes a fuselage defining a forward end, an aft end, and an interior cargo bay that spans a majority of a length of the fuselage from the forward end to the aft end. The fuselage includes a fixed portion defining a first region of the interior cargo bay, the fixed portion extending aft from a cargo opening and an articulating nose cargo door defining a second region of the interior cargo bay. The articulating nose cargo door is configured to move between an open position and a closed position such that, in the closed position, the articulating nose cargo door forms a closed forward end of the fuselage and in the open position the articulating nose cargo door is moved to expose the cargo opening into the first region of the interior cargo bay. The fuselage also includes a cantilevered support structure extending forward a length from the cargo opening in the fixed portion and towards the articulating nose cargo door when the articulating nose cargo door is in the closed position. In the closed position, the cantilevered support structure is disposed inside the articulating nose cargo door such that the length of the cantilevered support structure defines a longitudinal length of the second region of the interior cargo bay and| the second region of the interior cargo bay has a cargo volume along the longitudinal length of the second region of at least about 15% of the overall volume of the fuselage forward of an aft end of the cantilevered support structure, the aft end of the cantilevered support structure being an intersection of the cantilevered support structure and the cargo opening.

The cargo volume of the second region can be approximately in the range of about 15% to about 25% of the overall volume of the fuselage forward of the aft end of the cantilevered support structure. In some examples, the cantilevered support structure is fixed with respect to the fixed portion of the fuselage. At least a portion of the cantilevered support structure can be configured to rotate about a lateral axis with respect to the fixed portion of the fuselage. In some examples, the cantilevered support structure is configured to be partially supported by the articulating nose cargo door when the articulating nose cargo door is in the closed position. The cantilevered support structure can include an exterior surface portion of the fuselage that extends along a portion of the length of the articulating nose cargo door in the closed position. The fixed portion of the fuselage can include a lower support surface defining an interior cargo deck of the interior cargo volume and the cantilevered support structure can include an upper surface defining a portion of the interior cargo deck. In some examples, the lower support surface of the fixed portion of the fuselage abuts the upper surface of the cantilevered support structure and the fixed portion of the fuselage can include one or more structural keel beams extending along at least a portion of the length of the cantilevered support structure, such that that the one or more structural keel beams are configured to support at least a portion of the lower support surface of the fixed portion of the fuselage and the upper support surface of the cantilevered support structure. In some examples, the fixed portion of the fuselage comprises a longitudinal support structure extending along at least a majority of the first region and the cantilevered support structure comprises a forward extension of the longitudinal support structure.

In some examples, the articulating nose cargo door defines an effective length along a longitudinal axis of the forward end of the fuselage, the effective length extending from the aft end of the cantilevered support structure to the forward nose of the aircraft and the length of the cantilevered support structure can be at least approximately 25% of the effective length of the articulating nose cargo door. In some examples, the length of the cantilevered support structure is between approximately in the range of about 25% to about 50% of the effective length of the articulating nose cargo door. The length of the cantilevered support structure can be at least approximately 3% of a maximum payload length of the interior cargo bay. In some examples, the length of the cantilevered support structure is at least approximately 8 feet. In some examples, the interior cargo bay is configured to contain a payload having the maximum payload length and a maximum payload weight and the cantilevered support structure is configured to support a weight fraction of the maximum payload weight that is larger than a length fraction of the length of the cantilevered support structure with respect to the maximum payload length.

The second region can define a maximum diameter of at least approximately 15 feet. In some examples, the cantilevered support structure is configured to support at least approximately 5% of the maximum payload weight across the length of the cantilevered support structure. In some examples, the cantilevered support structure is configured to support at least approximately 20% of the maximum payload weight. In some examples, the cantilevered support structure is configured to support at least approximately 5% of the maximum payload weight at a forward terminal end of the cantilevered support structure.

The first and second regions of the interior cargo bay can together define a maximum cargo carrying length of the interior cargo bay of at least about 250 feet.

In some examples, the fuselage further comprises a nose defining a non-constant cross section of the forward end of the fuselage and the articulating nose cargo door comprises at least a forward-most portion of the nose. The articulating nose cargo door can further include at least an aft-most portion of the nose.

Another example of the present disclosure is method of loading a highly elongated payload onto a cargo aircraft. The method includes opening an articulating nose cargo door of a forward end of a cargo aircraft, the opened articulating nose cargo door exposing an opening into an interior cargo bay of the cargo aircraft that spans a majority of the length of the fuselage of the aircraft from the forward end and to an aft end, disposing the highly elongated payload into the interior cargo bay of the cargo aircraft, the highly elongated payload being at least partially supported by a cantilevered support structure extending forward a length from the opening and towards the articulating nose cargo door when the articulating nose cargo door closed, and holding an entirety of the highly elongated payload in the interior cargo bay when the an articulating nose cargo door is closed such that at least a portion of the highly elongated payload is disposed in a region of the interior cargo bay defined by the length of the cantilevered support structure. Where the region of the interior cargo bay has a cargo volume along the longitudinal length of the region of at least about 15% of the overall volume of the fuselage forward of an aft end of the cantilevered support structure by the cantilevered support structure. In some examples, holding an entirety of the highly elongated payload in the interior cargo bay includes the cantilevered support structure carrying at least a portion of the length and weight of the highly elongated payload, and the fraction of the weight of the highly elongated payload carried by the cantilevered support structure is higher than a fraction of the length of the cantilevered support structure to a length of the highly elongated payload.

The cargo volume of the region of the interior cargo bay can be defined by the length of the cantilevered support structure is approximately in the range of about 15% to about 25% of the overall volume of the fuselage forward of an aft end of the cantilevered support structure. In some examples, the cargo volume of the region of the interior cargo bay defined by the length of the cantilevered support structure defines a maximum diameter of at least approximately 15 feet. In some examples, the articulating nose cargo door defines an effective length along a longitudinal axis of the forward end of the fuselage, the effective length extending from the aft end of the cantilevered support structure to the forward nose of the aircraft and the length of the cantilevered support structure can be at least approximately 25% of the effective length of the articulating nose cargo door. In some examples, the fuselage comprises a longitudinal support structure extending along at least a majority fuselage aft of the opening and the cantilevered support structure comprises a forward extension of the longitudinal support structure.

Yet another example of the present disclosure includes a cargo aircraft including a fuselage defining a forward end, an aft end, and an interior cargo bay that spans a majority of a length of the fuselage from the forward end to the aft end. The fuselage includes a fixed portion defining a first region of the interior cargo bay, the fixed portion extending aft from a cargo opening; an articulating nose cargo door defining a second region of the interior cargo bay and configured to move between an open position and a closed position such that, in the closed position, the articulating nose cargo door forms a closed forward end of the fuselage and in the open position the articulating nose cargo door is moved to expose the cargo opening into the first region of the interior cargo bay, and a cantilevered support structure extending forward a length from the cargo opening in the fixed portion and towards the articulating nose cargo door when the articulating nose cargo door is in the closed position. Where, in the closed position, the cantilevered support structure is disposed inside the articulating nose cargo door such that the length of the cantilevered support structure defines a longitudinal length of the second region of the interior cargo bay, |the interior cargo bay is configured to hold a payload having a maximum payload length and a maximum payload weight, the length of the cantilevered support structure is at least approximately 3% of the maximum payload length of the interior cargo bay, and a forward end of the cantilevered support structure is configured to support a weight fraction of the maximum payload weight that is larger than a length fraction of the length of the cantilevered support structure with respect to the maximum payload length.

BRIEF DESCRIPTION OF DRAWINGS

This disclosure will be more fully understood from the following detailed description taken in conjunction with the accompanying drawings, in which:

FIG. 7B is a side view of the aircraft of FIG. 6A illustrating the cantilevered tongue being supported by a stanchion;

DETAILED DESCRIPTION

Figure 1A:
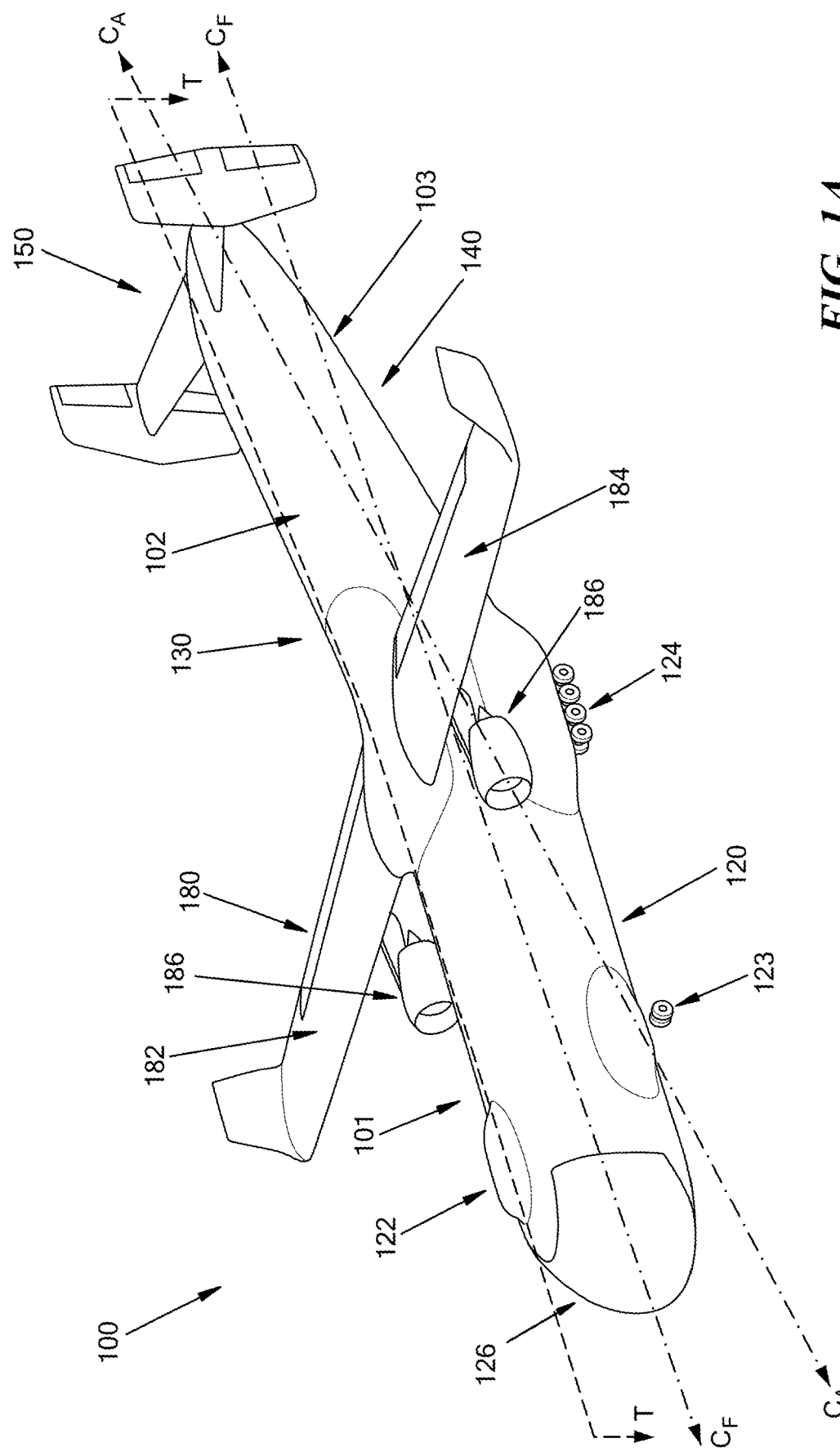
FIG. 1A is an isometric view of one exemplary embodiment of an aircraft.

Certain exemplary embodiments will now be described to provide an overall understanding of the principles of the structure, function, manufacture, and use of the devices, systems, aircraft, and methods disclosed herein. One or more examples of these embodiments are illustrated in the accompanying drawings. Those skilled in the art will understand that the devices, systems, aircraft, components related to or otherwise part of such devices, systems, and aircraft, and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure. Some of the embodiments provided for herein may be schematic drawings, including possibly some that are not labeled as such but will be understood by a person skilled in the art to be schematic in nature. They may not to be scale or may be somewhat crude renderings of the disclosed components. A person skilled in the art will understand how to implement these teachings and incorporate them into work systems, methods, aircraft, and components related to each of the same, provided for herein.

To the extent the present disclosure includes various terms for components and/or processes of the disclosed devices, systems, aircraft, methods, and the like, one skilled in the art, in view of the claims, present disclosure, and knowledge of the skilled person, will understand such terms are merely examples of such components and/or processes, and other components, designs, processes, and/or actions are possible. By way of non-limiting example, while the present application describes loading an airplane through a front end of the aircraft, alternatively, or additionally, loading can occur through an aft end of the aircraft and/or from above and/or below the aircraft. In the present disclosure, like-numbered and like-lettered components of various embodiments generally have similar features when those components are of a similar nature and/or serve a similar purpose. To the extent terms such as front, back, top, bottom, forward, aft, proximal, distal, etc. are used to describe a location of various components of the various disclosures, such usage is by no means limiting, and is often used for convenience when describing various possible configurations. The foregoing notwithstanding, a person skilled in the art will recognize the common vernacular used with respect to aircraft, such as the terms "forward' and "aft," and will give terms of those nature their commonly understood meaning. Further in some instances, terms like forward and proximal or aft and distal may be used in a similar fashion.

The present application is directed to cargo aircraft that permits use of otherwise wasted volume enclosed by a moveable nose cargo door. Examples include cargo aircraft with a forward-extending support beam configured to support a portion of the aircraft's payload in the volume enclosed by the moveable nose cargo door. The cantilevered support structure can support by auxiliary structure such as a gusset or diagonal strut in addition to or in replacement of being direct extension of the existing lower fuselage structure. The aircraft can be configured such that the cargo door and tongue geometries that do not clash as the door opens and the cargo door may be a single unit or one or more sub-doors, which swing vertically or to either side. Overall, the forward-extending support beam enables a cargo aircraft to increase a maximum payload length by allowing the supported cargo bay length to extend significantly into the length of a cargo nose door of the aircraft.

Aircraft

Figure 1B:
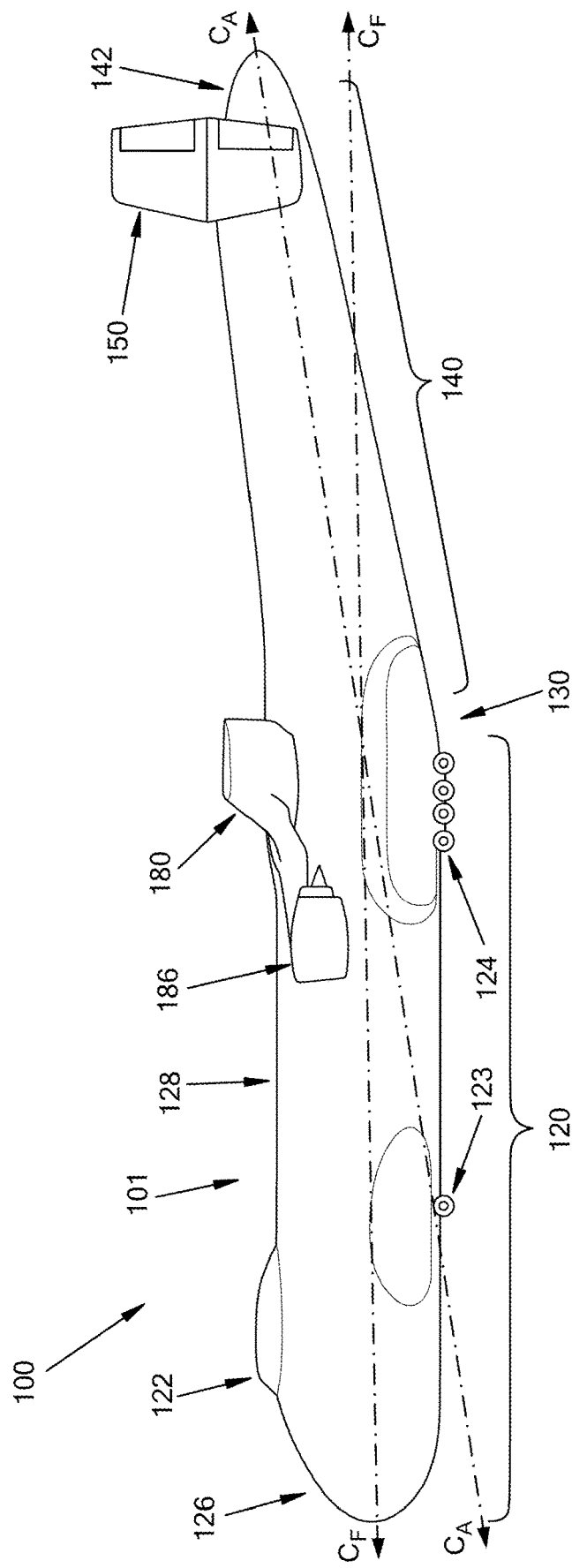
FIG. 1B is a side view of the aircraft of FIG. 1A.

The focus of the present disclosures is described with respect to a large aircraft 100, such as an airplane, illustrated in FIGS. 1A and 1B, along with the loading of a large payload into the aircraft, illustrated at least in FIGS. 2A-2D, 6B-6D, 8A, 8B, and 11A. Additional details about the aircraft and payload may be described with respect to the other figures of the present disclosure as well. In the illustrated embodiment, a payload 10 is a combination of two wind turbine blades 11A and 11B (FIGS. 2B-2D), although a person skilled in the art will appreciate that other payloads are possible. Such payloads can include other numbers of wind turbine blades (e.g., one, three, four, five, etc., or segments of a single even larger blade), other components of wind turbines (e.g., tower segments, generator, nacelle, gear box, hub, power cables, etc.), or many other large structures and objects whether related to wind turbines or not. The present application can be used in conjunction with most any large payload—large for the present purposes being at least about 57 meters long, or at least about 60 meters long, or at least about 65 meters long, or at least about 75 meters long, or at least about 85 meters long, or at least about 90 meters long, or at least about 100 meters long, or at least about 110 meters long, or at least about 120 meters long—or for smaller payloads if desired. Some non-limiting examples of large payloads that can be used in conjunction with the present disclosures beyond wind turbines include but are not limited to industrial oil equipment, mining equipment, rockets, military equipment and vehicles, defense hardware, commercial aerospace vehicles, crane segments, aircraft components, space launch rocket boosters, helicopters, generators, or hyperloop tubes. In other words, the aircraft 100 can be used with most any size and shape payload, but has particular utility when it comes to large, often heavy, payloads.

As shown, for example in FIGS. 1A-1B and 2A-2D, the aircraft 100, and thus its fuselage 101, includes a forward end 120 and an aft end 140, with a kinked portion 130 connecting the forward end 120 to the aft end 140. The forward end 120 is generally considered any portion of the aircraft 100, and related components, that are forward of the kinked portion 130 and the aft end 140 is considered any portion of the aircraft 100, and related components, that are aft of the kinked portion 130. The kinked portion 130, as described in greater detail below, is a section of the aircraft 130 in which both a top-most outer surface 102 and a bottom-most outer surface 103 of the fuselage 101 become angled (notably, the placement of reference numerals 102 and 103 in the figures do not illustrate location of the "kink" since they more generally refer to the top-most and bottom-most surfaces of the fuselage 101), as illustrated by an aft centerline $C_A$ of the aft end 140 of the fuselage 101 with respect to a forward centerline $C_F$ of the forward end 120 of the fuselage 101.

The forward end 120 can include a cockpit or flight deck 122, and landing gears, as shown a forward or nose landing gear 123 and a rear or main landing gear 124. The illustrated embodiment does not show various components used to couple the landing gears 123, 124 to the fuselage 101, or operate the landing gears (e.g., actuators, braces, shafts, pins, trunnions, pistons, cylinders, braking assemblies, etc.), but a person skilled in the art will appreciate how the landing gears 123, 124 are so connected and operable in conjunction with the aircraft 100. The forward-most end of the forward end 120 includes a nose cone 126. As illustrated more clearly in FIG. 2A, the nose cone 126 is functional as a door, optionally being referred to the nose cone door, thus allowing access to an interior cargo bay 170 defined by the fuselage 101 via a cargo opening 171 exposed by moving the nose cone door 126 into an open or loading position (the position illustrated in FIG. 2A; FIGS. 1A and 1B illustrate the nose cone door 126 in a closed or transport position). The door may operate by rotating vertically tip-upwards about a lateral axis, or by rotating horizontally tip-outboards about a vertical axis, or by other means as well such as translation forwards then in other directions, or by paired rotation and translation, or other means.

As described in greater detail below, the interior cargo bay 170 is continuous throughout the length of the aircraft 101, i.e., it spans a majority of the length of the fuselage. The continuous length of the interior cargo bay 170 includes the space defined by the fuselage 101 in the forward end 120, the aft end 140, and the kinked portion 130 disposed therebetween, such spaces being considered corresponding to the forward bay, aft bay, and kinked bay portions of the interior cargo bay 170. The interior cargo bay 170 can thus include the volume defined by nose cone 126 when it is closed, as well as the volume defined proximate to a fuselage tail cone 142 located at the aft end 140. In the illustrated embodiment of FIG. 2A, the nose cone door 126 is hinged at a top such that it swings clockwise towards the fuselage cockpit 122 and a fixed portion or main section 128 of the fuselage 101. In other embodiments, a nose cone door can swing in other manners, such as being hinged on a left or right side to swing clockwise or counter-clockwise towards the fixed portion 128 of the fuselage. The fixed portion 128 of the forwards fuselage 101 is the portion that is not the nose cone 126, and thus the forwards fuselage 101 is a combination of the fixed portion 128 and the nose cone 126. Alternatively, or additionally, the interior cargo bay 170 can be accessed through other means of access known to those skilled in the art, including but not limited to a hatch, door, and/or ramp located in the aft end 140 of the fuselage 101, hoisting cargo into the interior cargo bay 170 from below, and/or lowering cargo into the interior cargo bay 170 from above. One advantage provided by the illustrated configuration, at least as it relates to some aspects of loading large payloads, is that by not including an aft door, the interior cargo bay 170 can be continuous, making it significantly easier to stow cargo in the aft end 140 all the way into the fuselage tail cone 142. While loading through an aft door is possible with the present disclosures, doing so would make loading into and use of the interior cargo bay 170 space in the aft end 140 all the way into the fuselage tail cone 142 much more challenging and difficult to accomplish—a limitation faced in existing cargo aircraft configurations. Existing large cargo aircraft are typically unable to add cargo in this way (e.g., upwards and aftwards) because any kink present in their aft fuselage is specifically to create more vertical space for an aft door to allow large cargo into the forwards portion of the aircraft.

A floor 172 can be located in the interior cargo bay 170, and can also extend in a continuous manner, much like the bay 170 itself, from the forward end 120, through the kinked portion 130, and into the aft end 140. The floor 172 can thus be configured to have a forward end 172f, a kinked portion 172k, and an aft end 172a. In some embodiments, the floor 172 can be configured in a manner akin to most floors of cargo bays known in the art. In some other embodiments, discussed in greater detail below, one or more rails can be disposed in the interior cargo bay 170 and can be used to assist in loading a payload, such as the payload 10, into the interior cargo bay 170 and/or used to help secure the location of a payload once it is desirably positioned within the interior cargo bay 170. Additional fixtures and tooling designed to be used in conjunction with such rails are also discussed below at least with respect to FIGS. 11A-12.

Opening the nose cone 126 not only exposes the cargo opening 171 and the floor 172, but it also provides access from an outside environment to a cantilevered tongue 160 that extends from or otherwise defines a forward-most portion of the fixed portion 128 of the fuselage 101. The cantilevered tongue can be an extension of the floor 172, or it can be its own feature that extends from below or above the floor 172 and associated bottom portion of the fuselage 101. The cantilevered tongue 160 can be used to support a payload, thus allowing the payload to extend into the volume of the interior cargo bay 170 defined by the nose cone 126.

A wingspan 180 can extend substantially laterally in both directions from the fuselage. The wingspan 180 includes both a first fixed wing 182 and a second fixed wing 184, the wings 182, 184 extending substantially perpendicular to the fuselage 101 in respective first and second directions which are approximately symmetric about a longitudinal-vertical plane away from the fuselage 101, and more particularly extending substantially perpendicular to the centerline $C_F$. Wings 182, 184 being indicated as extending from the fuselage 101 do not necessarily extend directly away from the fuselage 101, i.e., they do not have to be in direct contact with the fuselage 101. Further, the opposite directions the wings 182, 184 extend from each other can alternatively be described as the second wing 184 extending approximately symmetrically away from the first wing 182. As shown, the wings 182, 184 define approximately no sweep angle and no dihedral angle. In alternative embodiments, a sweep angle can be included in the tip-forwards (−) or tip-aftwards (+) direction, the angle being approximately in the range of about −40 degrees to about +60 degrees. In other alternative embodiments, a dihedral angle can be included in the tip-downwards (negative, or "anhedral") or tip-upwards (positive, or "dihedral") direction, the angle being approximately in the range of about −5 degrees to about +5 degrees. Other typical components of wings, including but not limited to slats for increasing lift, flaps for increasing lift and drag, ailerons for changing roll, spoilers for changing lift, drag, and roll, and winglets for decreasing drag can be provided, some of which a person skilled in the art will recognize are illustrated in the illustrations of the aircraft 100 (other parts of wings, or the aircraft 100 more generally, not specifically mentioned in this detailed description are also illustrated and recognizable by those skilled in the art). Engines, engine nacelles, and engine pylons 186 can also be provided. In the illustrated embodiment, two engines 186, one mounted to each wing 182, 184 are provided. Additional engines can be provided, such as four or six, and other locations for engines are possible, such as being mounted to the fuselage 101 rather than the wings 182, 184.

The kinked portion 130 provides for an upward transition between the forward end 120 and the aft end 140. The kinked portion 130 includes a kink, i.e., a bend, in the fixed portion 128 of the fuselage 101 such that both the top-most outer surface 102 and the bottom-most outer surface 103 of the fuselage 101 become angled with respect to the centerline $C_F$ of the forward end 120 of the aircraft 100, i.e., both surfaces 102, 103 include the upward transition provided for by the kinked portion 130. As shown at least in FIG. 1B, the aft-most end of the aft end 140 can raise entirely above the centerline $C_F$. In the illustrated embodiment, the angle defined by the bottom-most outer surface 103 and the centerline $C_F$ is larger than an angle defined by the top-most outer surface 102 and the centerline $C_F$, although other configurations may be possible. Notably, although the present disclosure generally describes the portions associated with the aft end 140 as being "aft," in some instances they may be referred to as part of a "kinked portion" or the like because the entirety of the aft end 140 is angled as a result of the kinked portion 130. Thus, references herein, including in the claims, to a kinked portion, a kinked cargo bay or cargo bay portion, a kinked cargo centerline, etc. will be understood by a person skilled in the art, in view of the present disclosures, to be referring to the aft end 140 of the aircraft 100 (or the aft end in other aircraft embodiments) in some instances.

Despite the angled nature of the aft end 140, the aft end 140 is well-suited to receive cargo therein. In fact, the aircraft 100 is specifically designed in a manner that allows for the volume defined by the aft end 140, up to almost the very aft-most tip of the aft end 140, i.e., the fuselage tail cone 142, can be used to receive cargo as part of the continuous interior cargo bay 170. Proximate to the fuselage tail cone 142 can be an empennage 150, which can include horizontal stabilizers for providing longitudinal stability, elevators for controlling pitch, vertical stabilizers for providing lateral-directional stability, and rudders for controlling yaw, among other typical empennage components that may or may not be illustrated but would be recognized by a person skilled in the art.

Proximate to the fuselage tail cone 142 can be an empennage 150, which can include horizontal stabilizers for longitudinal stability, elevators for controlling pitch, vertical stabilizers for lateral-directional stability, and rudders for controlling yaw, among other typical empennage components that may or may not be illustrated but would be recognized by a person skilled in the art.

The aircraft 100 is particularly well-suited for large payloads because of a variety of features, including its size. A length from the forward-most tip of the nose cone 126 to the aft-most tip of the fuselage tail cone 142 can be approximately in the range of about 60 meters to about 150 meters. Some non-limiting lengths of the aircraft 100 can include about 80 meters, about 84 meters, about 90 meters, about 95 meters, about 100 meters, about 105 meters, about 107 meters, about 110 meters, about 115 meters, or about 120 meters. Shorter and longer lengths are possible. A volume of the interior cargo bay 170, inclusive of the volume defined by the nose cone 126 and the volume defined in the fuselage tail cone 142, both of which can be used to stow cargo, can be approximately in the range of about 1200 cubic meters to about 12,000 cubic meters, the volume being dependent at least on the length of the aircraft 100 and an approximate diameter of the fuselage (which can change across the length). One non-limiting volume of the interior cargo bay 170 can be about 6850 cubic meters. Not accounting for the very terminal ends of the interior cargo bay 170 where diameters get smaller at the terminal ends of the fuselage 101, diameters across the length of the fuselage, as measured from an interior thereof (thus defining the volume of the cargo bay) can be approximately in the range of about 4.3 meters to about 13 meters, or about 8 meters to 11 meters. One non-limiting diameter of the fuselage 101 proximate to its midpoint can be about 9 meters. The wingspan, from tip of the wing 132 to the tip of the wing 134, can be approximately in the range of about 60 meters to 110 meters, or about 70 meters to about 100 meters. One non-limiting length of the wingspan 180 can be about 80 meters. A person skilled in the art will recognize these sizes and dimensions are based on a variety of factors, including but not limited to the size and mass of the cargo to be transported, the various sizes and shapes of the components of the aircraft 100, and the intended use of the aircraft, and thus they are by no means limiting. Nevertheless, the large sizes that the present disclosure both provides the benefit of being able to transport large payloads, but faces challenges due, at least in part, to its size that make creating such a large aircraft challenging. The engineering involved is not merely making a plane larger. As a result, many innovations tied to the aircraft 100 provided for herein, and in other counterpart patent applications, are the result of very specific design solutions arrived at by way of engineering.

Materials typically used for making fuselages can be suitable for use in the present aircraft 100. These materials include, but are not limited to, metals and metal alloys (e.g., aluminum alloys), composites (e.g., carbon fiber-epoxy composites), and laminates (e.g., fiber-metallic laminates), among other materials, including combinations thereof.

Figure 2A:
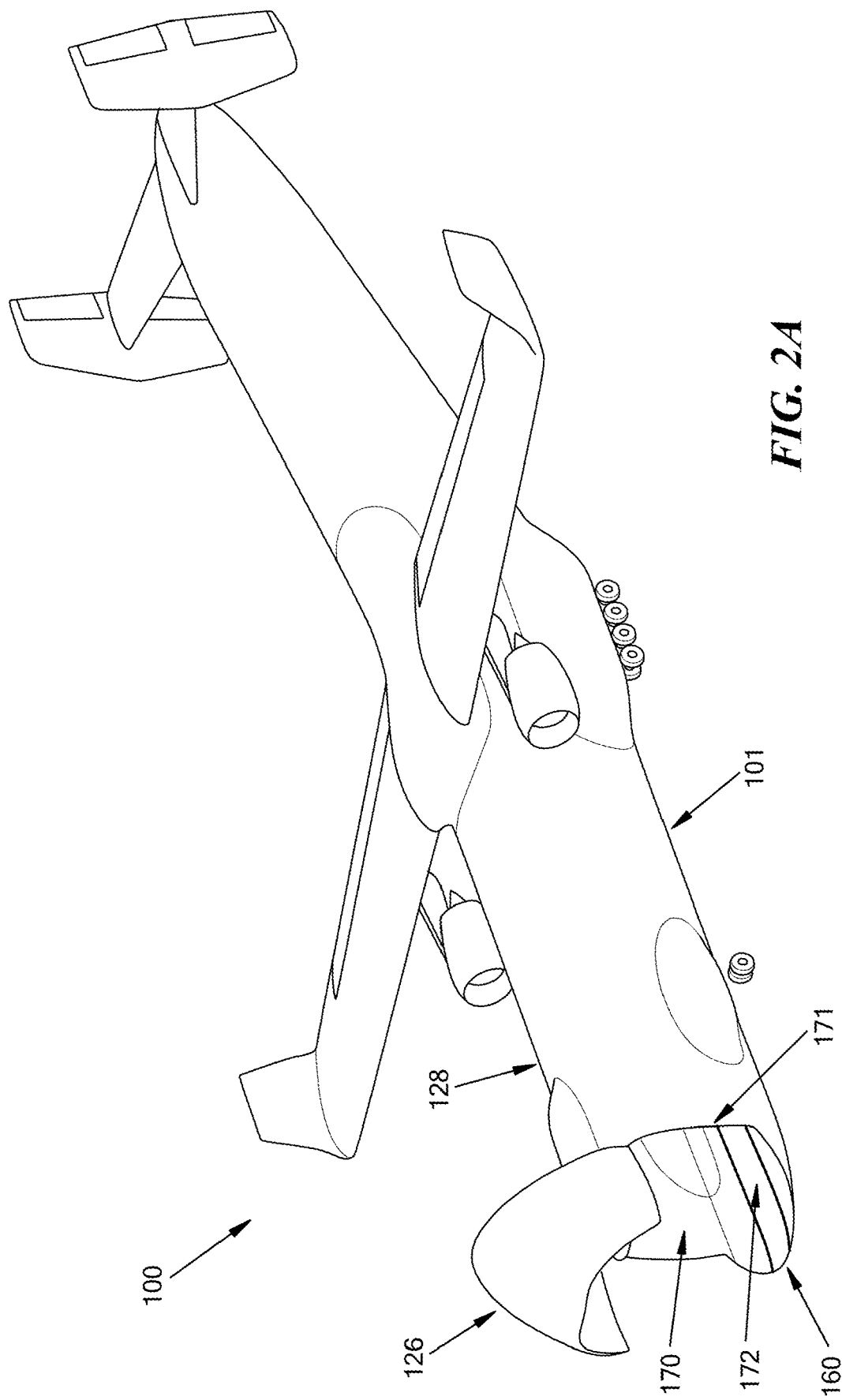
FIG. 2A is an isometric view of the aircraft of FIG. 1A with a nose cone door in an open position to provide access to an interior cargo bay of the aircraft.
Figure 2B:
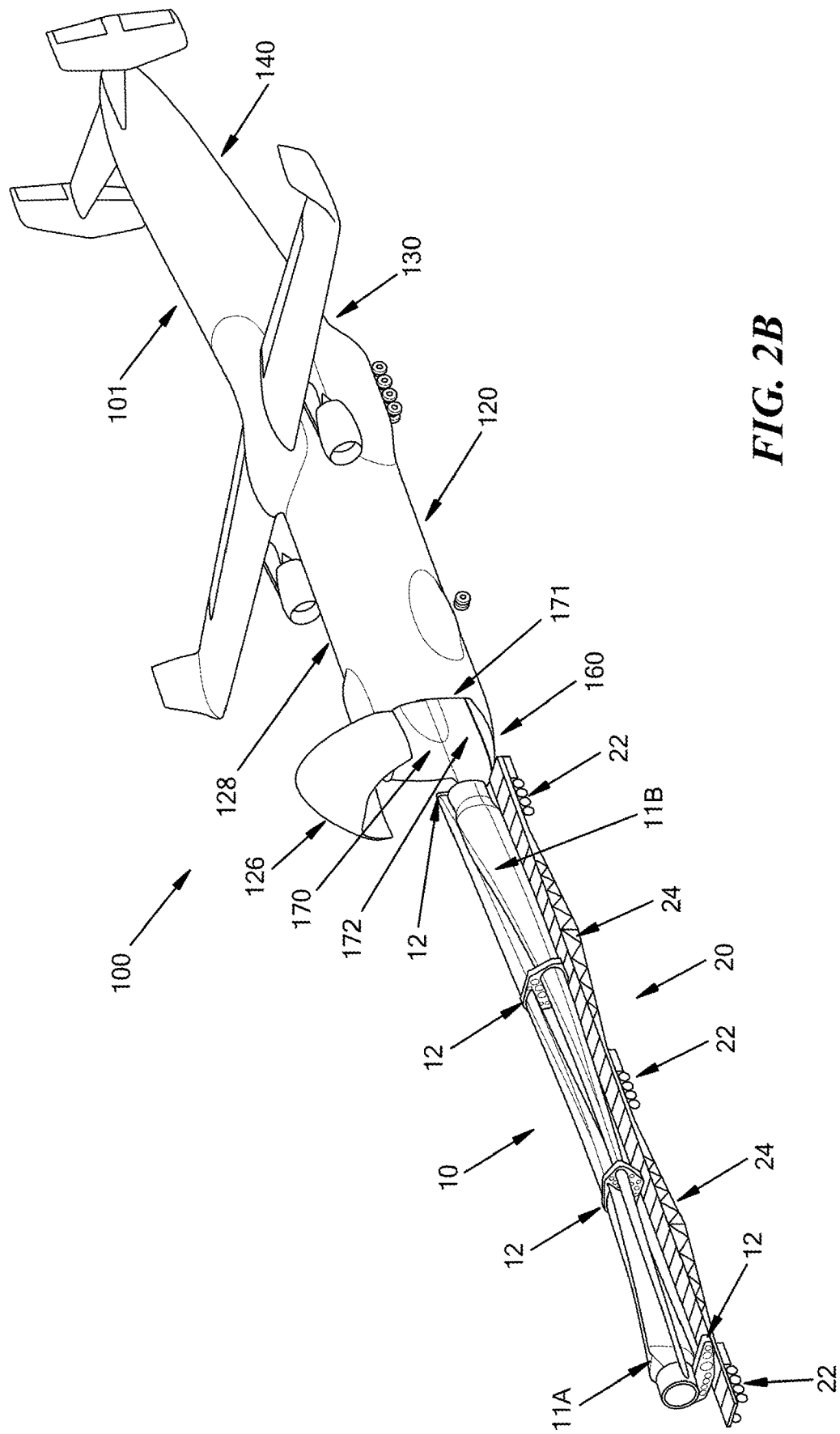
FIG. 2B is an isometric view of the aircraft of FIG. 2A with a payload being disposed proximate to the aircraft for loading into the interior cargo bay.
Figure 2C:
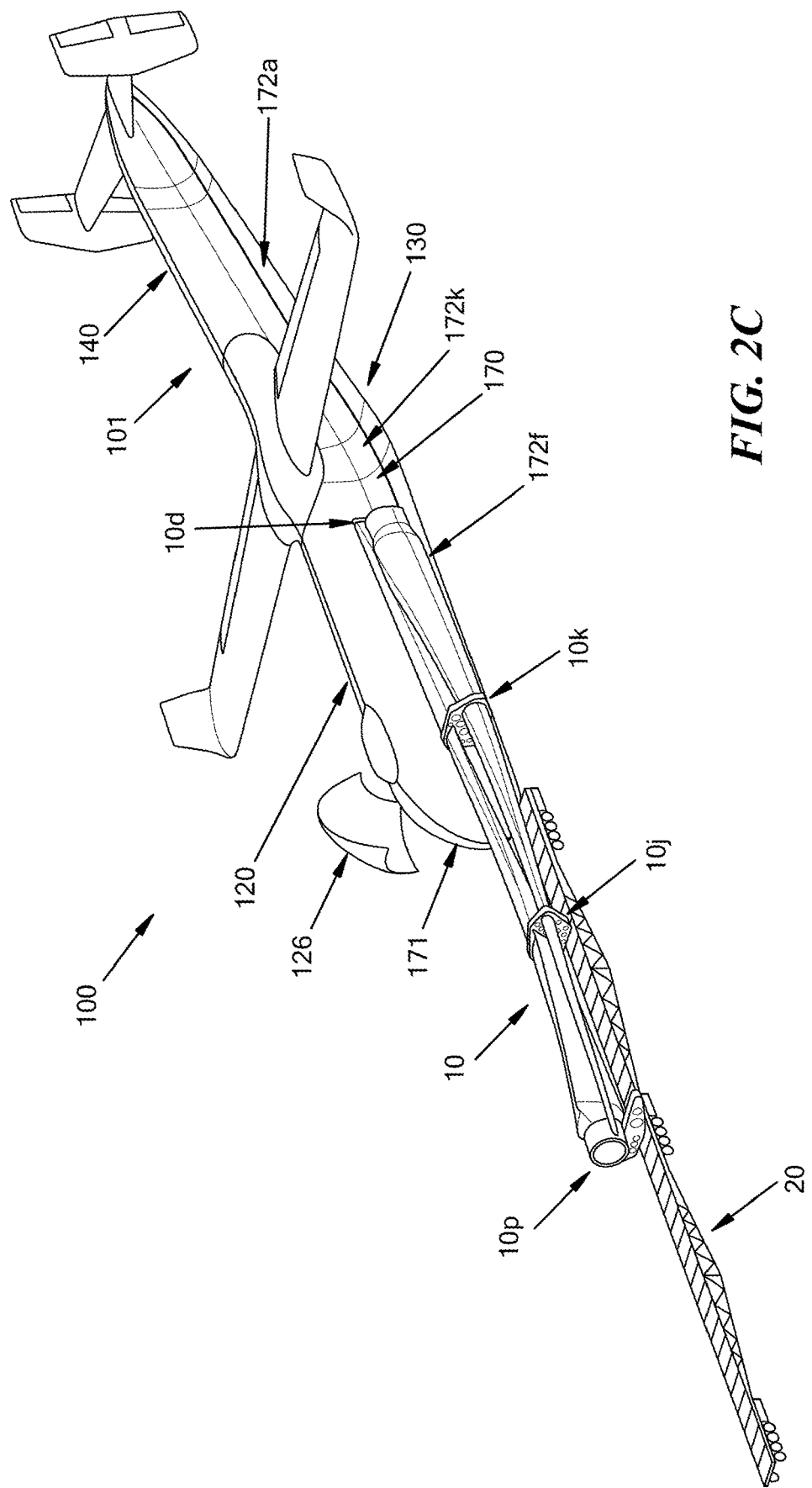
FIG. 2C is an isometric, partial cross-sectional view of the aircraft of FIG. 2B with the payload being partially loaded into the interior cargo bay.
Figure 2D:
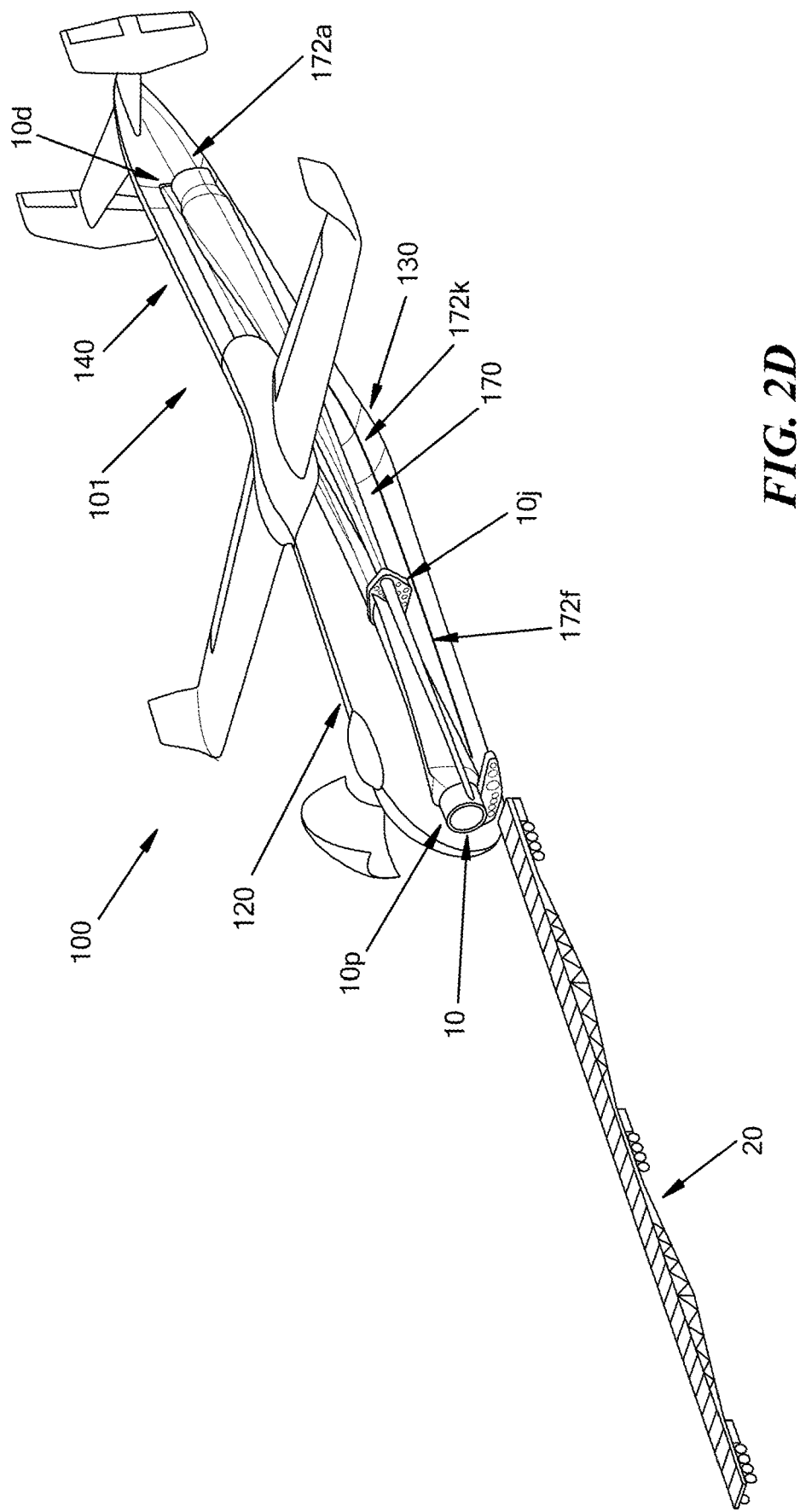
FIG. 2D is an isometric, partial cross-sectional view of the aircraft of FIG. 2B with the payload being fully loaded into the interior cargo bay.

FIGS. 2B-2D provide for a general, simplified illustration of one exemplary embodiment of loading a large payload 10 into the aircraft 100. As shown, the cargo nose door 126 is swung upwards into its open position, exposing the portion of the interior cargo bay 170 associated with the fixed portion 128 of the fuselage 101, which can extend through the kinked portion 130 and through essentially the entirety of the aft end 140. The cargo opening 171 provides access to the interior cargo bay 170, and the cantilevered tongue 160 can be used to help initially receive the payload. As shown, the payload 10 includes two wind turbine blades 11A, 11B, held with respect to each other by payload-receiving fixtures 12. The payload-receiving fixtures 12 are generally considered part of the payload, although in an alternative interpretation, the payload 10 can just be configured to be the blades 11A, 11B. This payload 10 can be considered irregular in that the shape, size, and weight distribution across the length of the payload is complex, causing a center of gravity of the payload to be at a separate location than a geometric centroid of the payload. One dimension (length) greatly exceeds the others (width and height), the shape varies with complex curvature nearly everywhere, and the relative fragility of the payload requires a minimum clearance be maintained at all times as well as fixturing support the length of the cargo at several locations even under the payload's own weight under gravity. Additional irregular payload criteria can include objects with profiles normal to a lengthwise axis rotate at different stations along that axis, resulting in a lengthwise twist (e.g., wind turbine blade spanwise twist) or profiles are located along a curved (rather than linear) path (e.g., wind turbine blade in-plane sweep). Additionally, irregular payloads include objects where a width, depth, or height vary non-monotonically along the length of the payload (e.g., wind turbine blade thickness can be maximal at the max chord station, potentially tapering to a smaller cylinder at the hub and to a thin tip). The term irregular package will be similarly understood.

The payload 10, which can also be referred to as a package, particularly when multiple objects (e.g., more than one blade, a blade(s) and ballast(s)) are involved, possibly secured together and manipulated as a single unit, can be delivered to the aircraft 100 using most any suitable devices, systems, vehicles, or methods for transporting a large payload on the ground. A package can involve a single object though. In the illustrated embodiment, a transport vehicle 20 includes a plurality of wheeled mobile transporters 22 linked together by a plurality of spans, as shown trusses 24. In some instances, one or more of the wheeled mobile transporters 22 can be self-propelled, or the transport vehicle 20 more generally can be powered by itself in some fashion. Alternatively, or additionally, an outside mechanism can be used to move the vehicle 20, such as a large vehicle to push or pull the vehicle 20, or various mechanical systems that can be used to move large payloads, such as various combinations of winches, pulleys, cables, cranes, and/or power drive units.

As shown in FIG. 2B, the transport vehicle 20 can be driven or otherwise moved to the forward end 120 of the aircraft 100, proximate to the cargo opening 171. Subsequently, the payload 10 can begin to be moved from the transport vehicle 20 and into the interior cargo bay 170. This can likewise be done using various combinations of one or more winches, pulleys, cables, cranes, and/or power drive units, such set-ups and configurations being known to those skilled in the art. FIG. 2C illustrates a snapshot of the loading process with half of the fuselage removed for illustrative purposes (as currently shown, the half of the nose cone 126 illustrated is in both an open and closed position, but during loading through the cargo opening 171, it is in an open position). As shown, the payload 10 is partially disposed in the interior cargo bay 170 and is partially still supported by the transport vehicle 20. A distal end 10$d$ of the payload 10 is still disposed in the forward end 120, as it has not yet reached the kinked portion 130.

The system and/or methods used to move the payload 10 into the partially loaded position illustrated in FIG. 2C can continue to be employed to move the payload 10 into the fully loaded position illustrated in FIG. 2D. As shown, the distal end 10$d$ of the payload 10$d$ is disposed in the interior cargo bay 170 at the aft end 140, a proximal end 10$p$ of the payload 10 is disposed in the interior cargo bay 170 at the forward end 120 (for example, on the cantilevered tongue 160, although the tongue is not easily visible in FIG. 2D), and the intermediate portion of the payload 10 disposed between the proximal and distal ends 10$p$, 10$d$ extends from the forward end 120, through the kinked portion 130, and into the aft end 140. As shown, the only contact points with a floor of the interior cargo bay 170 (which for these purposes includes the tongue 160) are at the proximal and distal ends 10$p$, 10$d$ of the payload 10 and at two intermediate points 10$j$, 10$k$ between the proximal and distal ends 10$p$, 10$d$, each of which is supported by a corresponding fixture 12. In other embodiments, there may be fewer or more contact points, depending, at least in part, on the size and shape of each of the payload and related packaging, the size and shape of the cargo bay, the number of payload-receiving fixture used, and other factors. This illustrated configuration of the payload disposed in the interior cargo bay 170 is more clearly understood by discussing the configuration of the kinked fuselage (i.e., the fuselage 101 including the kinked portion 130) in greater detail. Once the payload 10 is fully disposed in the interior cargo bay 170, it can be secured within the cargo bay 170 using techniques provided for herein, in counterpart applications, or otherwise known to those skilled in the art.

Kinked Fuselage

Figure 3:
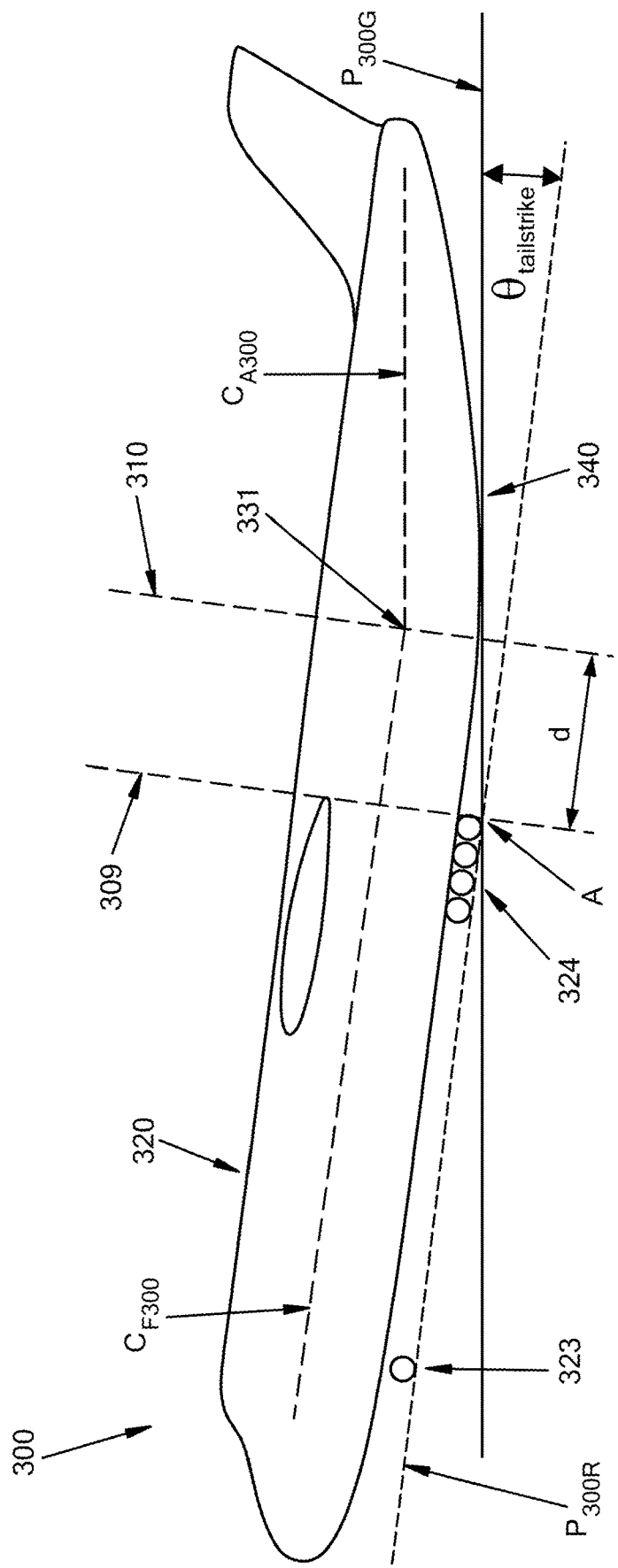
FIG. 3 is a schematic side view of an aircraft in the prior art, illustrating a lateral axis of rotation with respect to tail strike.

FIG. 3 is an illustration of a prior art aircraft 300 during a takeoff pitch-up maneuver showing the calculating of a tailstrike angle ($\theta_{tailstrike}$), which is determined when a forward end 320 of the aircraft 300 is lifted away from the ground 50 (e.g., a runway of an airport) and an aft end 340 and tail of the aircraft 300 is pushed towards the ground 50 until contact. This change occurs during a takeoff pitch-up maneuver when the aircraft 300 pitches (e.g., rotates) about a lateral axis of rotation, indicated as "A" in FIG. 3. This lateral axis of rotation, A, is typically defined by the main landing gear 324, which acts as a pivot point to allow a downwards force generated by the tail to lift the forward end 320 of the aircraft 300. In FIG. 3, the nose landing gear 323 and main landing gear 324 of the aircraft 300 define a resting plane $P_{300R}$ (e.g., plane horizontal with the ground plane $P_{300G}$ when the aircraft is resting), such that the tailstrike angle $\theta_{tailstrike}$ can be defined by the change in the angle of the ground plane $P_{300G}$ with respect to the resting plane $P_{300R}$ when the aircraft 300 has achieved a maximal pitch angle or takeoff angle, which occurs just before any part of the aft end 340 of the aircraft 300 strikes the ground. In FIG. 3, a forward center line $C_{F300}$ of the aircraft 300 is shown, along with an aft centerline $C_{A300}$, which extends to the aft end 340 of the aircraft 300. In order to increase $\theta_{tailstrike}$, larger aircraft 300 usually have an upsweep to the lower surface of an aft region of the aft fuselage. This upsweep deflects the centerline $C_{A300}$ with respect to the forward center line $C_{F300}$ at the initiation of the upsweep, which is shown in FIG. 3 as a bend 331 in the centerlines $C_{F300}$, $C_{A300}$. In prior art aircraft 300, this bend 331 occurs a certain distance, shown in FIG. 3 as distance "d" aft of the lateral axis of rotation A. Longer values of distance "d" increase the constant cross-section length of the aircraft 300, which can, depending on the type of aircraft, extend the length of a passenger cabin and/or increase the length of the cargo bay, and thus the ability to carry cargo of an increased maximum length. Aspects of the present disclosure eschew this prior art incentive for increasing distance "d" and instead significantly reconfigure the relationship between the aft fuselage and forward fuselage such that decreasing distance "d" can result in increasing the maximum usable cargo bay length, as explained in more detail below.

Figure 4A:
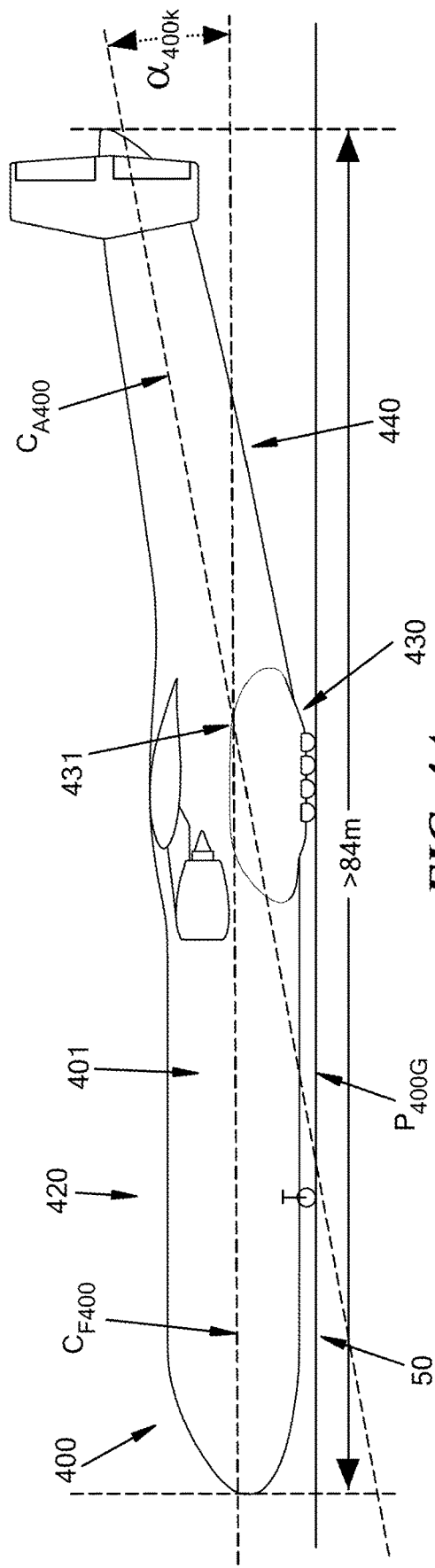
FIG. 4A is a side view of an alternative exemplary embodiment of an aircraft.
Figure 4B:
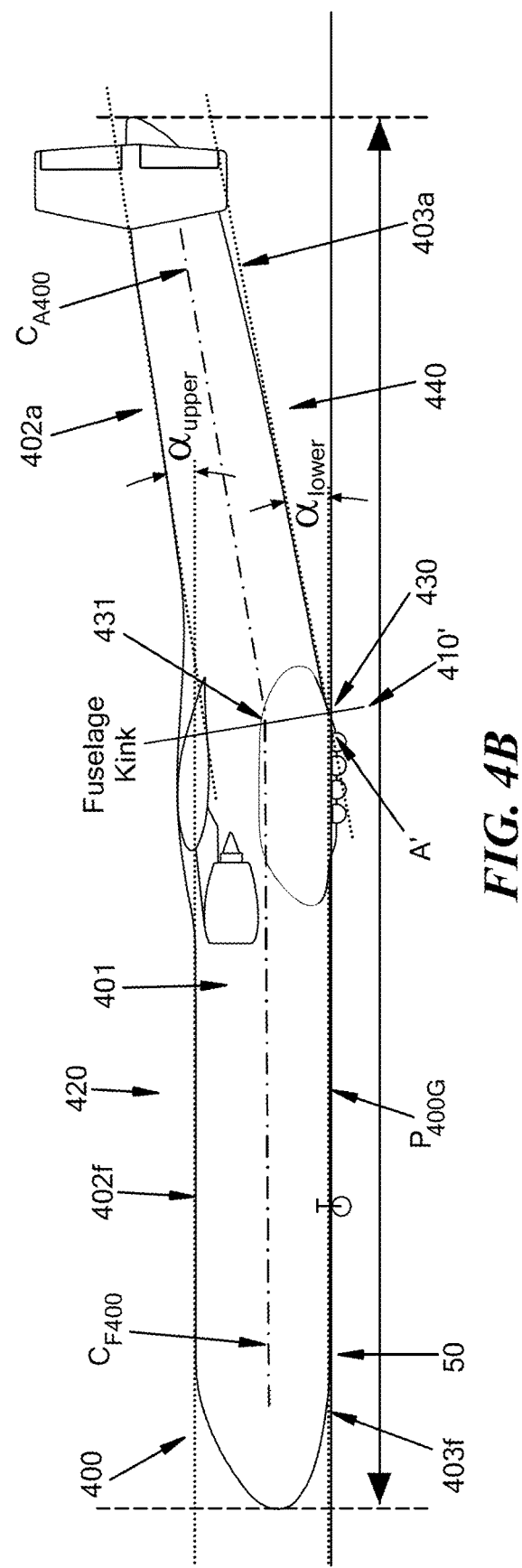
FIG. 4B is a side transparent view of the aircraft of FIG. 4A.

FIG. 4A is a side view illustration of an exemplary cargo aircraft 400 of the present disclosure. The aircraft 400, which is shown to be over 84 meters long, includes a fuselage 401 having a forward end 420 defining a forward centerline $C_{F400}$ and an aft end 440 defining an aft centerline $C_{A400}$, with the aft centerline $C_{A400}$ being angled up with respect to the forward centerline $C_{F400}$. The forward and aft centerlines $C_{F400}$, $C_{A400}$ define a junction or kink 431 therebetween, where the forward centerline $C_{F400}$ angles upward as the overall aft fuselage, which is in the aft end 440, changes in direction to be angled with respect to the forward fuselage, which is in the forward end 420. This defines a kink angle $\alpha_{400K}$ of the aft fuselage 440. The kink location 431 is contained in the kinked portion 430 disposed between and connecting the forward and aft ends 420, 440. FIG. 4B shows the forward centerline $C_{F400}$ as being an approximate midpoint between a top-most outer or upper surface 402$f$ and a bottom-most outer or lower surface 403$f$ of the fuselage 401 forward of a lateral axis of rotation A', with the aft centerline $C_{A400}$ being an approximate midpoint between an upper surface 402$a$ and a lower surface 403$a$ of the fuselage 401 aft of the lateral axis of rotation. FIG. 4B shows the kink 431 between the forward centerline $C_{F400}$ and the aft centerline $C_{A400}$ as being an approximate change in the angle of a plane 410' substantially perpendicular to the centerline $C_{F400}$ and most of the upper and lower surfaces 402$a$, 403$a$ extending aft from the kink 431, such that the fuselage 401 aft of the kink 431 has a substantial portion of an approximately constant height or cross-sectional area. This represents only one example, and in other instances the upper surface 402$a$ does not necessarily extend approximately parallel to the lower surface 402$b$ at all even if the aft fuselage still defines a kink 431 in the centerline.

In FIG. 4B, the angle of the aft centerline $C_{A400}$ with respect to the forward centerline $C_{F400}$ defines a kink or bend angle (illustrated as $\alpha_{400K}$ in FIG. 4A), which can be approximately equal to average of an angle $\alpha_{upper}$ of the after upper surface e 402a and an angle $\alpha_{lower}$ of the lower surface 403a with respect to the forward centerline $C_{F400}$ and forward upper and lower surfaces 402f, 403f for the case of a constant cross-section forward fuselage 401, as shown in FIG. 4B (hence, FIG. 4B indicating the upper and lower surfaces 402a, 403a defining the respective upper and lower angles $\alpha_{upper}$, $\alpha_{lower}$). In some instances, the angles $\alpha_{upper}$, $\alpha_{lower}$ of the aft upper and lower surfaces 402a, 403a vary with respect to the angle of the aft centerline $C_{A400}$, with the location of a substantial upward deflection in the overall centerline (e.g., kink 431) being defined by the overall shape and slope of the aft fuselage with respect to the forward fuselage (or more generally the overall shape and slope of the aft end 440 with respect to the forward end 420). For example, for the aircraft 100 of FIG. 1B, the lower surface defines a lower angle $\alpha_{lower}$, which is approximately equal to the tailstrike angle of approximately 12 degrees, and the upper surface angle $\alpha_{upper}$ in the aft fuselage is approximately between 6 and 7 degrees. In some exemplary embodiments, the result kink angle of the aft centerline $C_{A400}$ can be approximately in the range of about 0.5 degrees to about 25 degrees, and in some instance it is about 10 degrees with respect to a longitudinal—lateral plane of the cargo aircraft 100, i.e., a plane in which the forward centerline $C_{F400}$ is disposed, the plane extend substantially parallel to the ground or a ground plane $P_{400G}$. Further, the kink angle $\alpha_{400K}$ can be approximately equal to a degree of maximal rotation of the aircraft during the takeoff operation. Still further, a length of the aft end 140, i.e., the portion that is angled with respect to the forward centerline $C_{F400}$, can be approximately in the range of about 15% to 65%, and in some instances about 35% to about 50% of a length of the entire fuselage 101, and in some embodiments it can be about 49% the length of the fuselage 101.

Figure 4C:
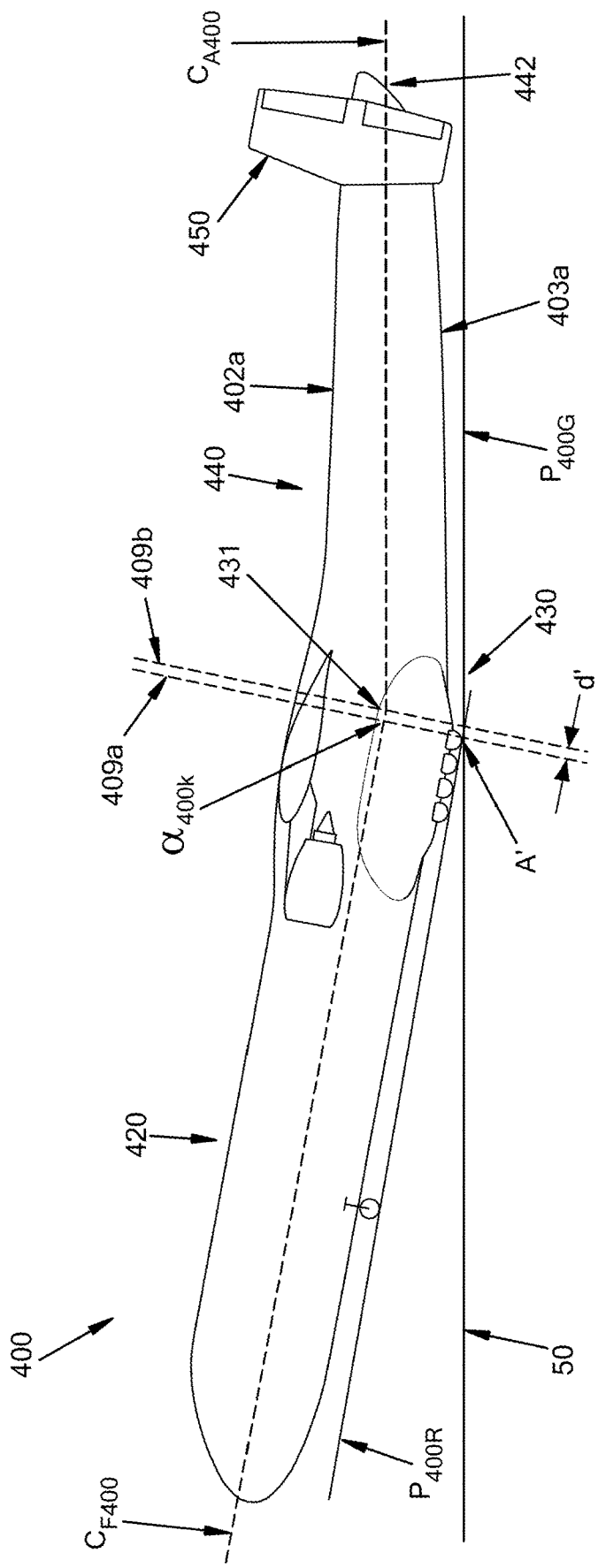
FIG. 4C is a side view of the aircraft of FIG. 4B in a take-off position.
Figure 5:
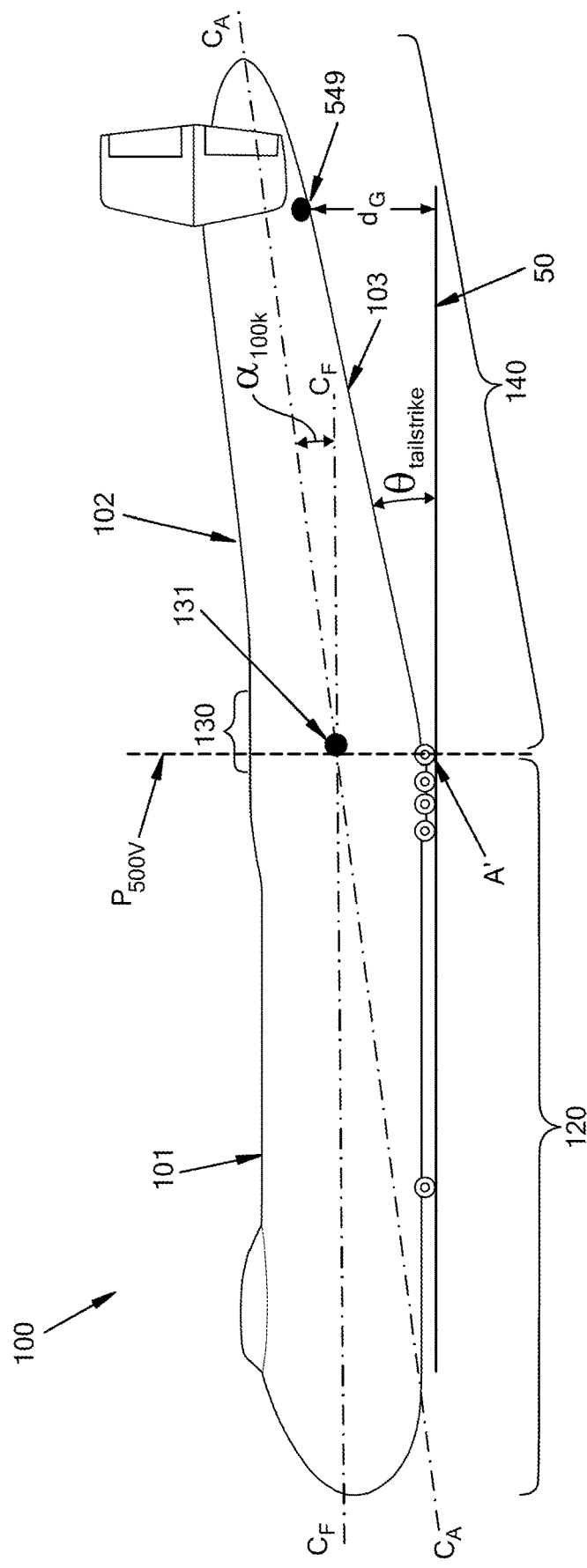
FIG. 5 is the side view of the aircraft of FIG. 1A with some additional details removed for clarity.

In FIG. 4C, the cargo aircraft 400 is shown on the ground 50 and rotated about the lateral axis of rotation to illustrate, for example, a takeoff pitch-up maneuver. In FIG. 4C, a resting plane $P_{400R}$ of the forward end 420 angled with respect to the ground or ground plane $P_{400G}$ at a degree just before $\theta_{tailstrike}$, as no part of the aft end 440, empennage 450, or tail 442 is contacting the ground. In this position, the lower surface 403a (and, approximately, the aft centerline $C_{A400}$) is substantially parallel with the ground or ground plane $P_{400G}$, and it can be seen that because the location of the centerline kink 431 of the kinked portion 430 is approximately with, or very close to, the lateral axis of rotation A', the angle $\alpha_{400K}$ of the kink 431 is approximately the maximum safe angle of rotation of the aircraft 400 about the lateral axis of rotation A'. FIG. 4C shows a vertical axis 409a aligned with the location of the lateral axis of rotation A' and another vertical axis 409b aligned with the kink 431 in the fuselage centerline $C_{F400}$, with a distance d' therebetween. With d' being small, and the lower surface 403a of the aft end 440 extending aft with approximately the kink angle $\alpha_{400K}$ of the kink 431 or a slightly larger angle, as shown, the aft end 440 is highly elongated without risking a tail strike. Accordingly, minimizing d' approximately sets the lower angle $\alpha_{lower}$ as an upper limit to the safe angle of rotation about the lateral pitch axis. Moreover, the upward sweep of the upper surface 402a can be arranged to maintain a relatively large cross-sectional area along most of the aft end 440, thereby enabling a substantial increase in the overall length of the cargo aircraft 400, and thus usable interior cargo bay within the aft end 440, without increasing $\theta_{tailstrike}$. FIG. 5 shows this in further detail for the cargo aircraft 100 of FIG. 1A.

In FIG. 5, the aft centerline $C_A$ and forward centerline $C_F$ of the fuselage 101 are shown intersecting at a kink location 131 just aft of the vertical plane $P_{500V}$ of the lateral axis of rotation A', which occurs within the kinked portion 130 connecting the forward end or fuselage 120 to the aft end or fuselage 140. The lower surface 103 of the aft fuselage 140 approximately defines $\theta_{tailstrike}$ of the cargo aircraft 100, which is slightly larger than a kink angle $\alpha_{100K}$ defined by the upslope of the aft centerline $C_A$ with respect to the forward centerline $C_F$. Additionally, in some examples, the aft fuselage can include a sensor 549 configured to measure the distance $d_G$ of the lower surface 103 of the aft fuselage 140 to the ground 50 to assist the pilot and/or computer in control of the aircraft 100 in maximally rotating the aircraft 100 about the lateral pitch axis without tailstrike.

As explained in more detail below, vertically aligning the kink location 131 with the lateral pitch axis can enable the aft fuselage 140 to extend without decreasing $\theta_{tailstrike}$, which also can enable the useable portion of the interior cargo bay 170 to extend aft along a substantial portion of the aft fuselage 140. Further, the present designs can enable the creation of extremely long aircraft designs capable of executing takeoff and landing operations with shorter runway lengths than previously possible. These lengths can be the equivalent of existing typical runway lengths, or even shorter, which is surprising for an airplane that is longer. Runway lengths approximately in the range of about 500 meters to about 1000 meters are likely possibly in view of the present disclosures, as compared to existing runways, which are about 2000 meters for standard aircraft and about 3000 meters for larger aircrafts. Thus, the engineering related to the aircraft 100, 400, and other embodiments of aircraft derivable from the present disclosures, enable extremely large aircraft that can be used on runways that are the smaller than runways for aircraft that are considered to be large aircraft due, at least in part, to the designs enabling increased pitch angles without causing tailstrike.

A further advantage provided by the present designs is being able to maintain the location of the center-of-gravity of the aircraft close to the lateral pitch axis, which minimizes the downforce required by the tail to rotate the aircraft during takeoff. This minimization of necessary downforce allows pitch-up maneuvers to occur at slower speeds, thereby increasing the available angle of attack (and thus lift) able to be generated at a given speed, which in turn reduces the speed necessary to generate enough lift to get the aircraft off the ground. This advantage is not achievable in prior art designs that attempt to increase their cargo length efficiency (e.g., maximum linear payload length as a function of overall fuselage length) at least because: (1) a reduction in tailstrike angle as the aft fuselage is elongated aft of the lateral rotation axis (e.g., in designs with an aft fuselage bend location being a substantial distance from their lateral axis of rotation); (2) a reduced ability to complete a pitch-up maneuver at low-speeds if the lateral pitch axis is moved aft of the center-of-gravity of the aircraft to accommodate the elongated fuselage, necessitating a substantial increase in wing and/or tail size to achieve the takeoff lengths equal to aircraft designs having lateral pitch axis closer to their center-of-gravity; and/or (3) a reduction in the cargo bay diameter as the aft end of the cargo bay is extended further toward the tail.

Figure 6A:
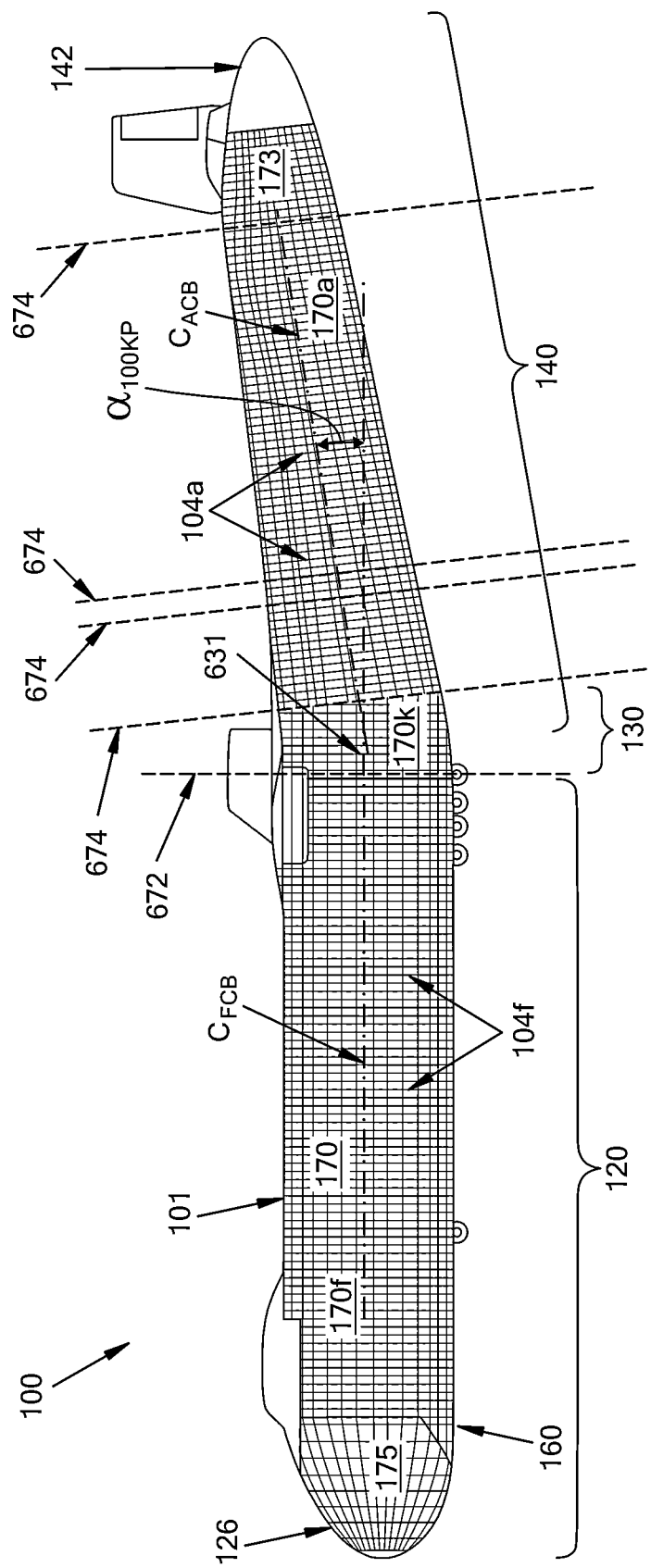
FIG. 6A is a side cross-sectional view of the aircraft of FIG. 5, including an interior cargo bay of the aircraft.

FIG. 6A is side cross-section view of the cargo aircraft 100, the cross-section being taken along an approximate midline T-T of the top-most outer surface, as shown in FIG. 1A. The cargo bay 170 defines a centerline that extends along the overall length of the cargo bay 170. The cargo bay 170 extends from a forward-most region 175 of a forward end or region 170f of the cargo bay 170, as shown located in the nose cone 126, to an aft end 173 of an aft end or region 170a of the cargo bay 170, as shown located in the fuselage tail cone 142. The forward and aft regions 170f, 170a of the cargo bay 170 sit within the forward and aft ends 120, 140, respectively, of the aircraft 100. More particularly, the forward region 170f can generally define a forward cargo centerline $C_{FCB}$ that can be substantially colinear or parallel to the forward fuselage centerline $C_F$ (shown in FIG. 5) and the aft region 170a can generally define an aft cargo centerline $C_{ACB}$ that can be substantially colinear or parallel to the aft fuselage centerline $C_A$ (shown in FIG. 5). Accordingly, in the kinked portion 130 of the fuselage 101, which itself can include a comparable kinked portion 170k of the cargo bay 170, where the aft fuselage centerline $C_A$ bends with respect to the forward fuselage centerline $C_F$, the aft cargo centerline $C_{ACB}$ also bends at a kink location 631 with respect to the forward cargo centerline $C_{FCB}$. The bend can be at approximately the same angle, as shown an angle $\alpha_{100KP}$, as the kink angle $\alpha_{100k}$ of the fuselage 101. The aft cargo centerline $C_{ACB}$ can extend at least approximately 25% of a length of a centerline of the continuous interior cargo bay 170, i.e., the length of the centerline throughout the entire cargo bay 170. This amount more generally can be approximately in the range of about 25% to about 50%. There are other ways to describe these dimensional relationships as well, including, by way of non-limiting example, a length of the aft cargo centerline $C_{ACB}$ being at least approximately 45% of the length of the fuselage 101 and/or at least approximately 80% of a length of the fuselage 101 aft of the lateral pitch axis, among other relationships provided for herein or otherwise derivable from the present disclosures.

FIG. 6A shows the aft region 170a of the cargo bay 170 extending through almost all of the aft fuselage 140, which is a distinct advantage of the configurations discussed herein. Moreover, due to the length of the aft fuselage 140, a pitch 674 of structural frames 104a of the aft fuselage 140 can be angled with respect to a pitch 672 of structural frames 104f of the forward fuselage 120 approximately equal to the kink angle $\alpha_{100K}$ of the fuselage 101. In some examples, the kinked region 130 represents an upward transition between the pitch 672 of the structural frames 104f of the forward fuselage 120 and the pitch 674 of the structural frames 104a of the aft fuselage 140. A person skilled in the art will recognize that structural frames 104a, 104f are merely one example of structural features or elements that can be incorporated into the fuselage 101 to provide support. Such elements can be more generally described as circumferentially-disposed structural elements that are oriented orthogonally along the aft centerline $C_{ACB}$ and the forward centerline $C_{FCB}$. In some examples, the location of the cargo bay kink 631 (FIG. 6A) is forward or aft of the fuselage kink 131 (FIG. 5) such that either the forward cargo region 170f partially extends into the aft fuselage 140 or the aft cargo region 170a partially extends into the forward fuselage 120, however, this generally depends, at least in part, on the distance between the interior of the cargo bay 170 and the exterior of the fuselage, which is typically a small distance for cargo aircraft having a maximally sized cargo bay. Regardless, to fully utilize examples of the present disclosure, the aft region 170a of the cargo bay 170 can be both (1) able to be substantially extended due to the ability of the aft fuselage 140 length to be extended and (2) able to extend along substantially all of the length of the aft fuselage 140 because examples of the present disclosure enable aircraft to have elongated aft fuselages for a fixed tailstrike angle and/or minimized kink angle. Additionally, minimizing the fuselage kink angle for elongated aft fuselages allows the aft region of the cargo bay to extend further along the fuse fuselage while increasing the maximum straight-line payload length for a given overall aircraft length and tailstrike angle, as shown at least in FIGS. 6B and 6C.

Figure 6B:
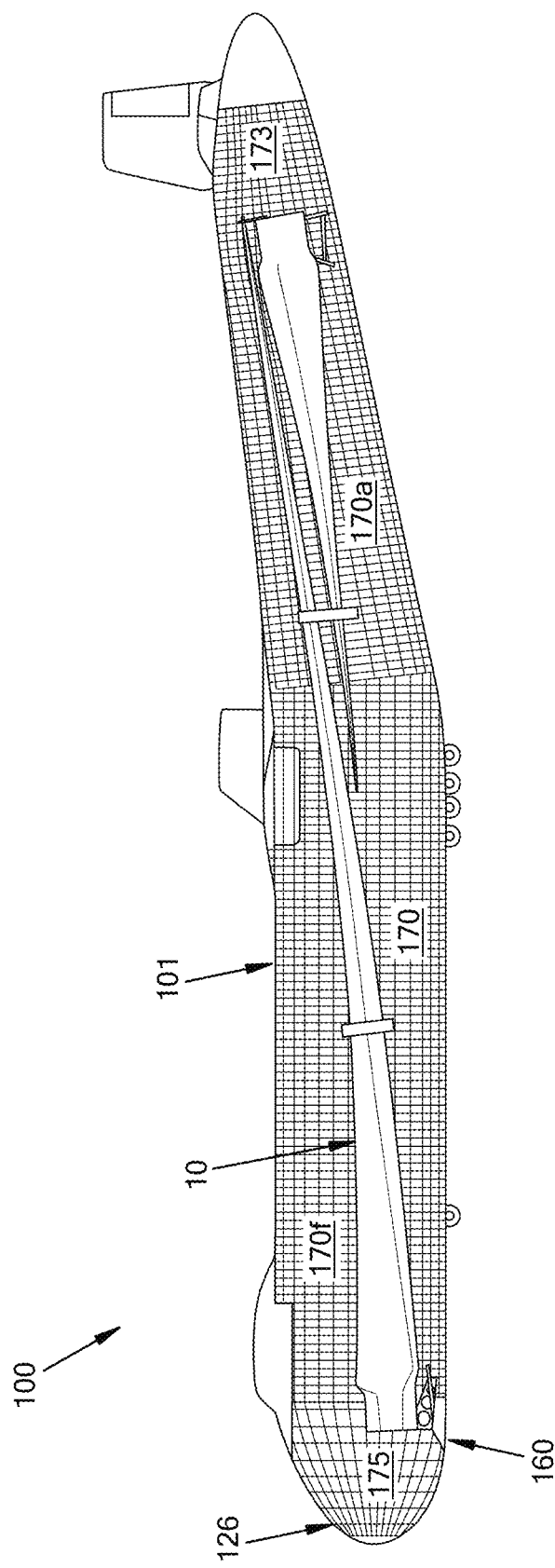
FIG. 6B is the side cross-sectional view of the aircraft of FIG. 6A with an exemplary payload disposed in the interior cargo bay.

FIG. 6B shows a side cross-sectional view of the fuselage 101 of the cargo aircraft 100 of FIG. 6A with a highly elongated payload 10 of two wind turbine blades 11A, 11B disposed substantially throughout the interior cargo bay 170 and extending from the forward-most region 175 of the forward region 170f to the aft end 173 of the aft region 170a. Having at least a portion of the aft region 170a being linearly connected to (e.g., within line of sight) of at least a portion of the forward region 170f enables the extension of the aft region 170a to result in an extension in the maximum overall length of a rigid payload capable of being carried inside the interior cargo bay 170. Wind turbine blades, however, are often able to be deflected slightly during transport and so examples of the present disclosure are especially suited to their transport as the ability to slightly deflect the payload 10 during transport enables even long maximum payload lengths to be achieved by further extending the aft end 173 of the aft region 170a beyond the line of sight of the forward-most region 175 of the forward region 170f.

Figure 6C:
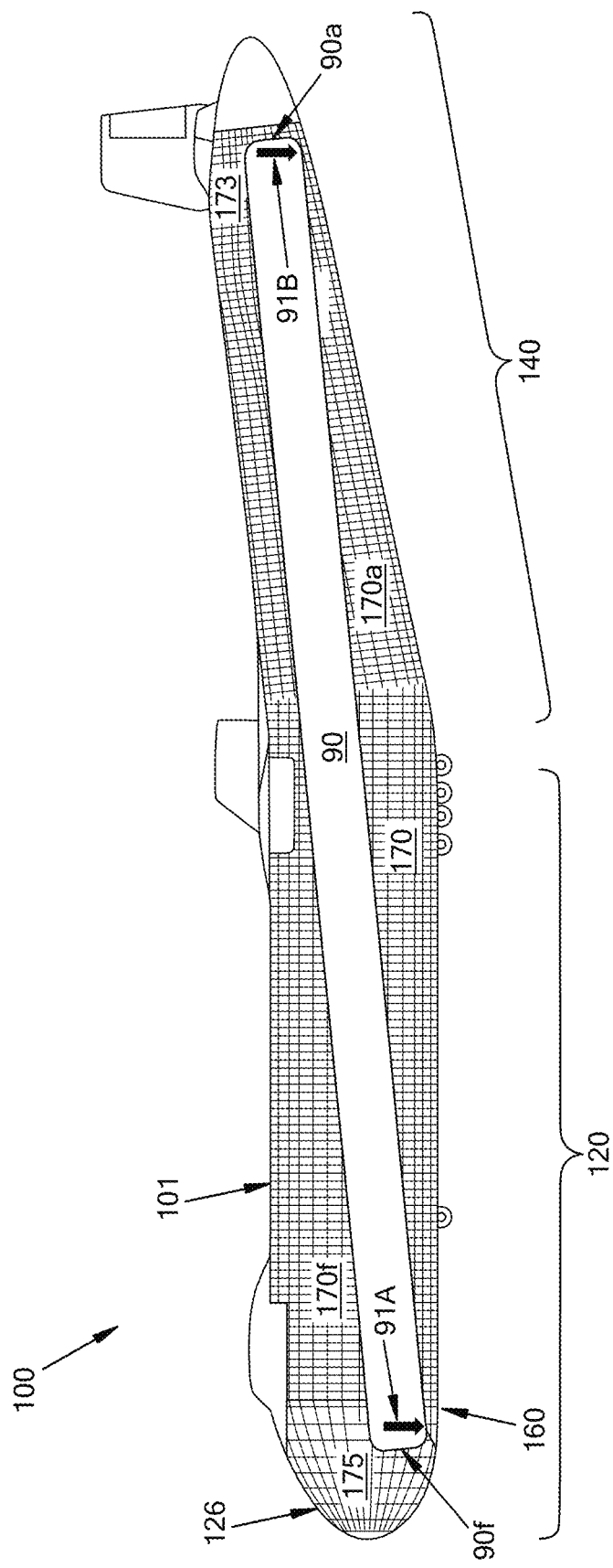
FIG. 6C is the side cross-sectional view of the aircraft of FIG. 6A with a schematic of an exemplary maximum-length payload disposed in the interior cargo bay.

FIG. 6C is the same cross-sectional view of the fuselage 101 of the cargo aircraft 100 of FIG. 6B with a maximum length rigid payload 90 secured in the cargo bay 170. A forward end 90f of the maximum length rigid payload 90 can be secured to the cantilevered tongue 160 in the forward-most region 175 of the forward region 170f with a first portion of the weight of the payload 90 (shown as vector 91A) being carried by the cantilevered tongue 160 and an aft end 90a of the maximum length rigid payload 90 can be secured to the aft end 173 of the aft region 170a with a second portion of the weight of the payload 90 (shown as vector 91B) being carried by the aft end 173 of the aft region 170a.

Figure 6D:
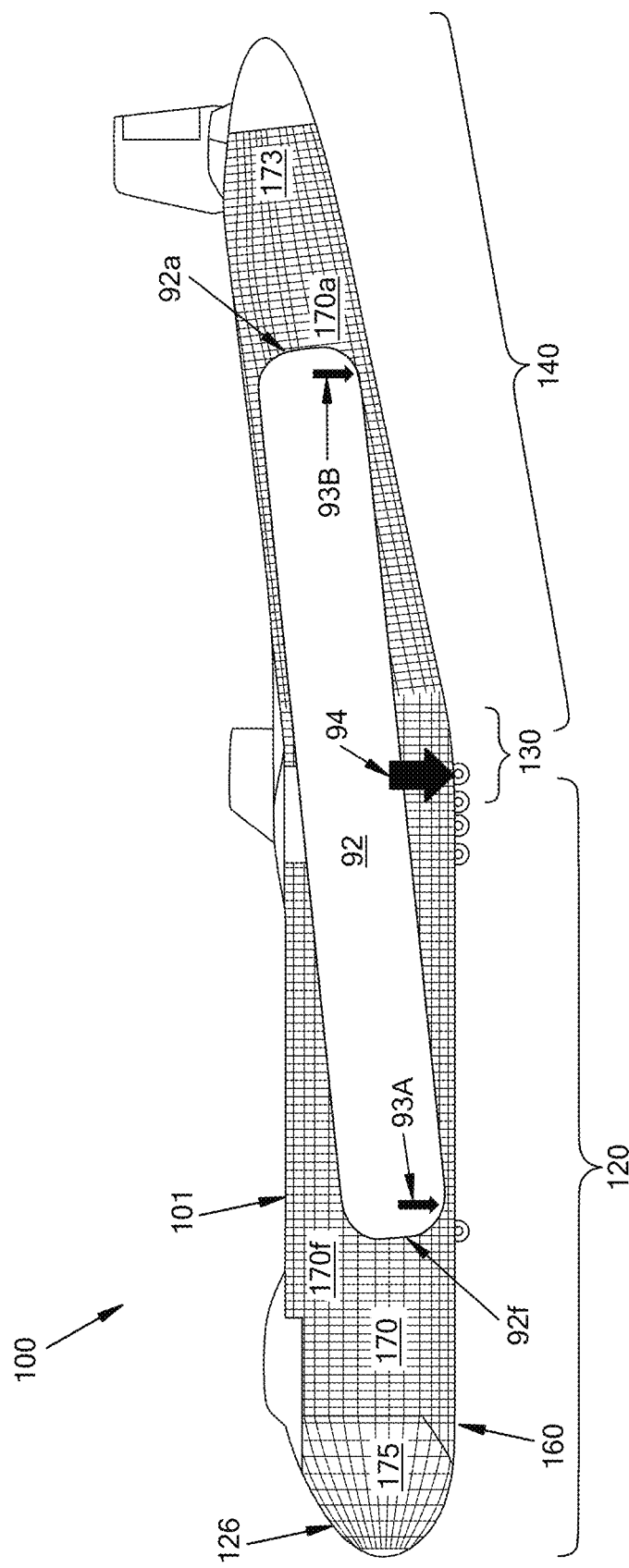
FIG. 6D is the side cross-sectional view of the aircraft of FIG. 6A with a schematic of an exemplary maximum-weight payload disposed in the interior cargo bay of the aircraft.

FIG. 6D is the same cross-sectional view of the fuselage 101 of the cargo aircraft 100 of FIG. 6A with a maximum weight payload 92 secured in the cargo bay 170. A forward end 92f of the maximum weight payload 92 can be secured in the forward region 170f of the interior cargo bay 170 with a first portion of the weight of the payload 92 (shown as vector 93A) being carried by the forward fuselage 120 and an aft end 92a of the maximum weight payload 92 can be secured in the aft region 170a of the interior cargo bay 170 with a second portion of the weight of the payload 92 (shown as vector 93B) being carried by the aft fuselage 140. Advantageously, the substantial length of the cargo bay 170 forward and aft of the a center-of-gravity of the aircraft 100 (e.g., approximately aligned with the kinked region 130) enables positioning of the maximum weight payload 92 such that the payload center-of-gravity (shown as vector 94) substantially close (i.e., within about 30% of wing Mean Aerodynamic Cord (MAC) or about 4% of total aircraft length) to or aligned with the center-of-gravity of the aircraft 100. In some examples, at least about 10% of the weight of maximum weight payload 92 is carried in the aft region 170a. In some examples of carrying a maximum weight payload, especially payloads approaching a maximum length, about 40% to about 50% could be carried in the aft region 170a in order to center the payload's center of gravity at a nominal location in the cargo bay 170.

Additional details about a kinked fuselage configuration may be provided in a counterpart patent application entitled "AIRCRAFT FUSELAGE CONFIGURATIONS FOR AVOIDING TAIL STRIKE WHILE ALLOWING LONG PAYLOADS," filed concurrently herewith, the content of which is incorporated by reference herein in its entirety.

Extended Cantilevered Tongue for Cargo Support

Figure 7A:
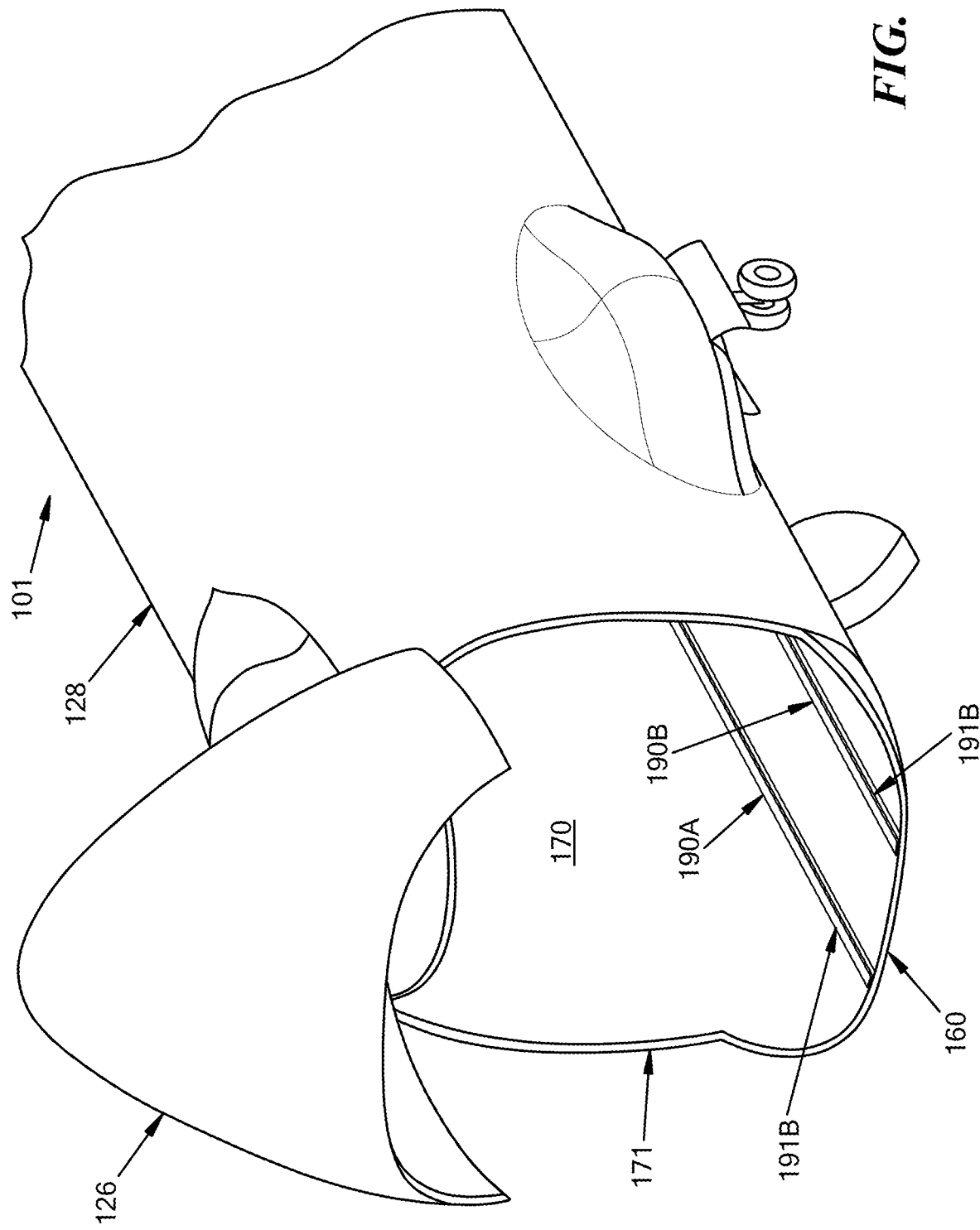
FIG. 7A is a perspective view of the aircraft of FIG. 6A illustrating a lower support system that extends along the interior cargo bay and the cantilevered tongue.

FIG. 7A is a perspective view of the cargo aircraft 100 of FIG. 6A showing a lower support system 190A, 190B that extends along the cargo bay 170 from a forward entrance 171 to and through the aft section 170*a* (not visible) of the cargo bay 170 in the aft portion 140 (not visible) of the fuselage 101. The lower support system 190A, 190B can include forward portions 191A, 191B that extend forward along the cantilevered tongue 160 as well. In some examples, the lower support system 190A, 190B includes rails or tracks, or similar linear translation components, that enable a payload to be translated into the cargo bay 170 and all the way to the aft end of the aft region 170*a* of the cargo bay 170 from the cargo opening 171, for instance by having the lower support system 190A, 190B extend through nearly an entire length of the fixed portion 128 of the fuselage 101. In some examples, the lower support system 190A, 190B can be used to support and/or the payload during flight such that the lower support system 190A, 190B can hold substantially all of the weight of the payload.

FIG. 7B is a side view of the aircraft 100 with the nose cone door 126 open and the complete length of the forward extension of the cantilevered tongue 160 from the cargo opening 171 visible. The cantilevered tongue 160 can be supported by a direct connection to a longitudinal support structure 106 of the fixed portion 128 of the fuselage 101. For example, the cantilevered tongue 160 can include a forward extension 166 of one or more structural support beams, sometimes including keel beams of some aircraft, of the fuselage 101. In some instances, and as shown in FIG. 7B, the cantilevered tongue 160 includes gussets 168 on opposite lateral sides of the cantilevered tongue 160. In some instances, and also as shown in FIG. 7B, an exterior of one of both of the cantilevered tongue 160 and the gussets 168 can be part of the exterior surface of the fuselage 101. In some examples, the cantilevered tongue 160 is supported by one or more cables or wires extending from the fixed portion 128, which may be removeably attached and, for example, only used during cargo loading or unloading in order for the cantilevered tongue 160 to support forces from the payload that were larger than those the cantilevered tongue 160 would experience during flight if the cantilevered tongue 160 was supported some portion of the payload's weight while secured in the cargo bay 170. In some examples, and to support additional weight during loading or unloading, one or more stanchions 60 can be placed on the ground 50 such that the cantilevered tongue 160 rests on the stanchions 60 and at least some portion of the forces applied to the cantilevered tongue 160 are directed through the stanchions to the ground and not through the cantilevered tongue's 160 connection to the fixed portion 128 of the fuselage 101.

While the cargo nose door 126 has been shown opening from an upper hinge, other arrangements are considered within the scope of this disclosure, for example rotating about a vertical hinge or evening being completed detached from the fixed portion 128 of the fuselage 102 in order to access the cargo opening 171.

Figure 8A:
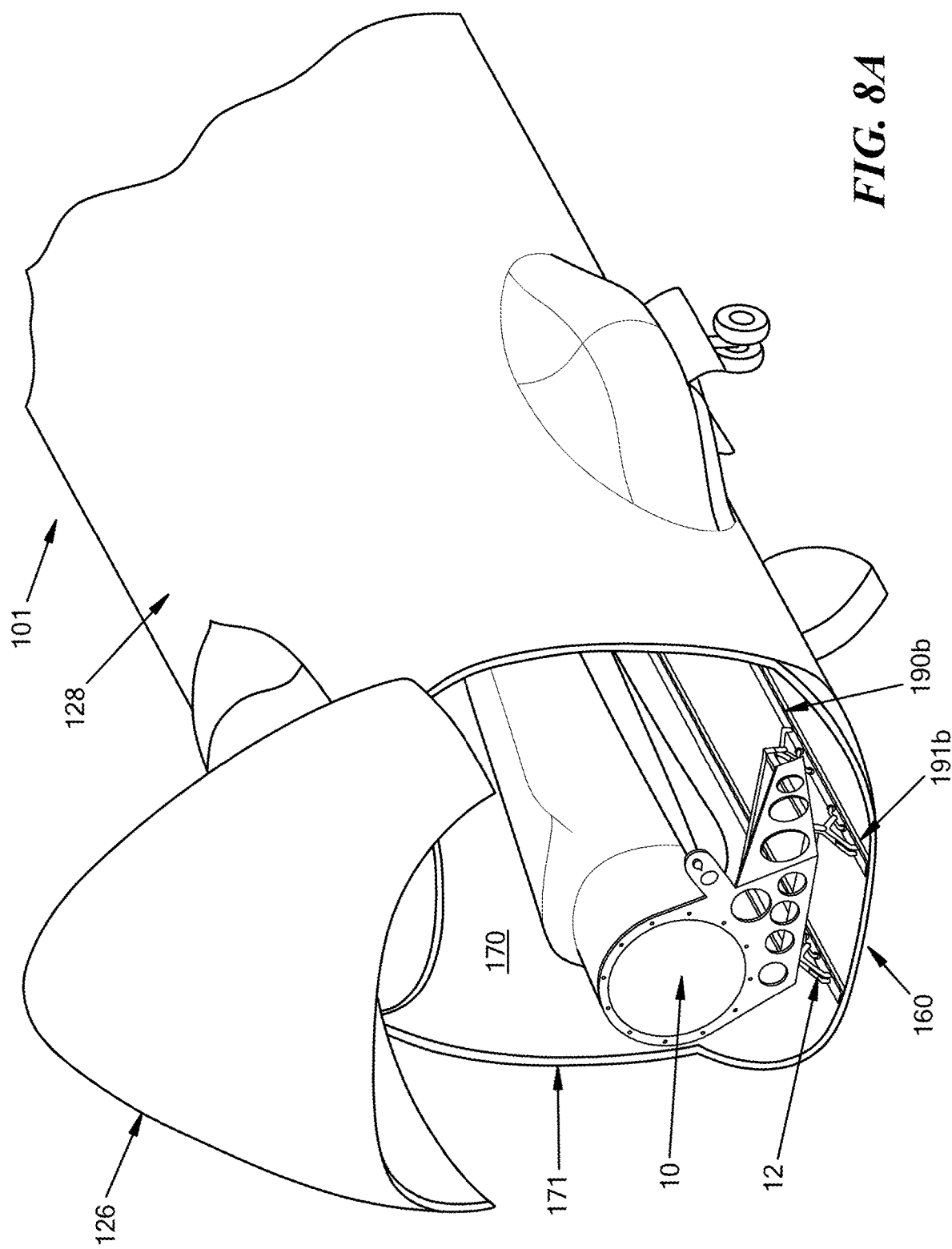
FIG. 8A is a perspective view of the aircraft and payload configuration of FIG. 6B illustrating a forward end of the payload being supported by the cantilevered tongue and in a location that will be inside the volume of the fuselage enclosed by the nose cone door when closed.
Figure 8B:
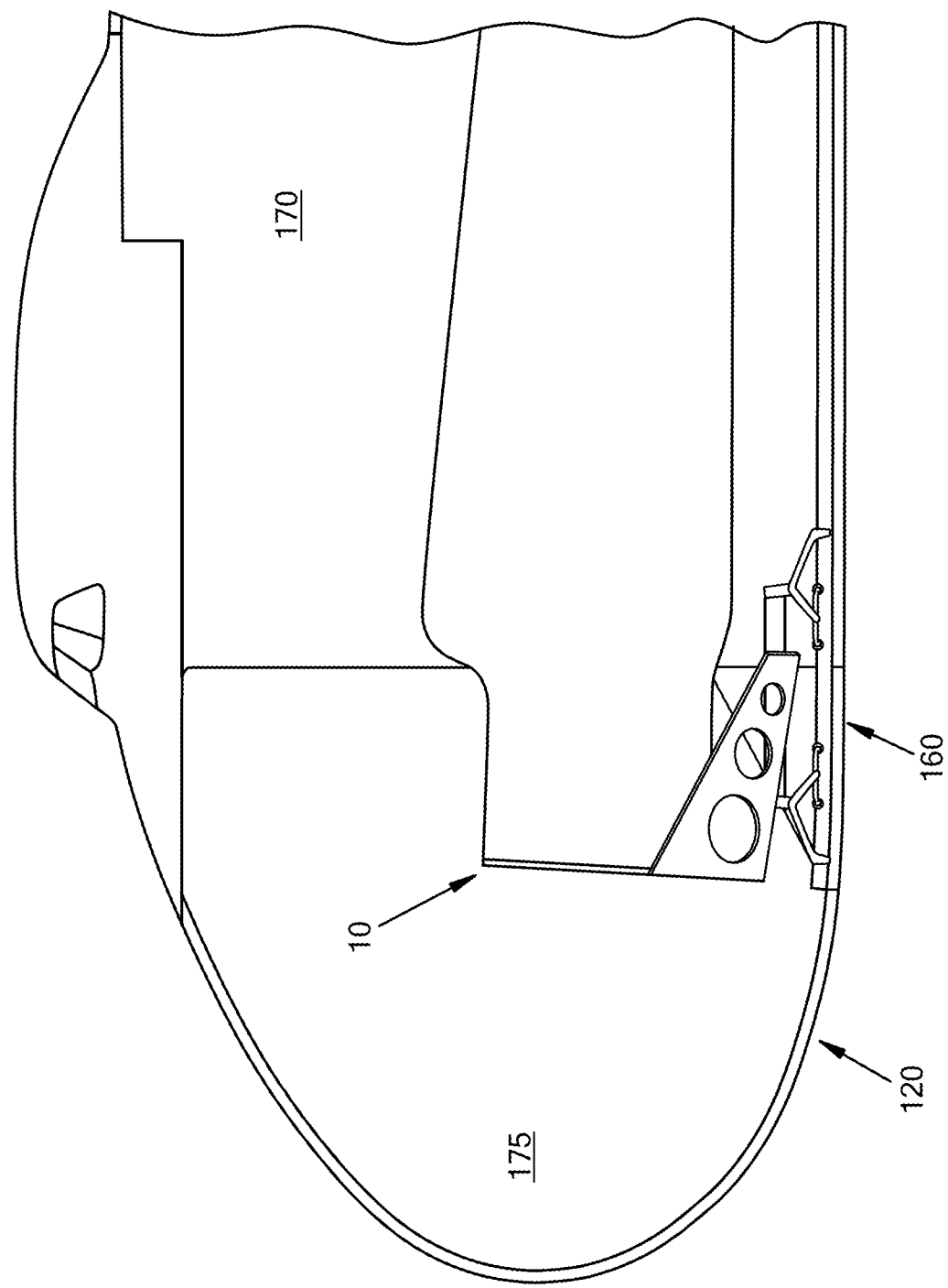
FIG. 8B is a side view of the aircraft and payload configuration of FIG. 6B illustrating the forward end of the payload being enclosed by the nose cone door in a closed position.

FIG. 8A is a perspective view of the aircraft 100 and payload 10 configuration of FIG. 6B illustrating a forward end of the payload 10 being supported by the cantilevered tongue 160. FIG. 8A can illustrate, for example, a flight-ready configuration of the payload 10 with respect to the cantilevered tongue 160, whereby closing the nose cone door 126 would locate the forward end of the payload 10 inside the nose cone door 126 while being completely supported by the cantilevered tongue 160. In FIG. 8A, the forward receiving fixture 12 of the payload 10 is almost completely supported by the cantilevered tongue 160 and, accordingly, the cantilevered tongue 160 is configured to support a substantial portion of the weight of the payload 10 and resulting in-flight forces. In some examples, the cantilevered tongue 160 is configured to support a substantially larger fraction of the weight of the payload compared to the length of the cantilevered tongue 160 with respect to the length of the payload length and/or the length of the cargo bay 170. For example, and as shown in FIG. 8A, the cantilevered tongue 160 is approximately in the range of about 2.5 meters (8 feet) long to about 3 meters (10 feet) long (as measured from the cargo opening 171) and is configured to support approximately 20% of the maximum payload weight capable of being carried in the cargo hold 170, while extending along approximately 3% or 4% of the length of the cargo bay 170. FIG. 8B is a side view of the aircraft 100 and payload 10 configuration of FIG. 6B illustrating the forward end of the payload being enclosed by the nose cone door 12 in a closed position. The extension of the cantilevered tongue 160 into the nose cone door enables a supported portion of the cargo bay 170 to extend into the forward-most region 175 along the cantilevered tongue 160. For example, FIGS. 8A and 8B show that a supported cargo region above the cantilevered tongue 160 occupies at least about 15% of the overall volume of the fuselage 101 forward of the cargo opening 171, as explained in more detail in FIG. 9.

Figure 9:
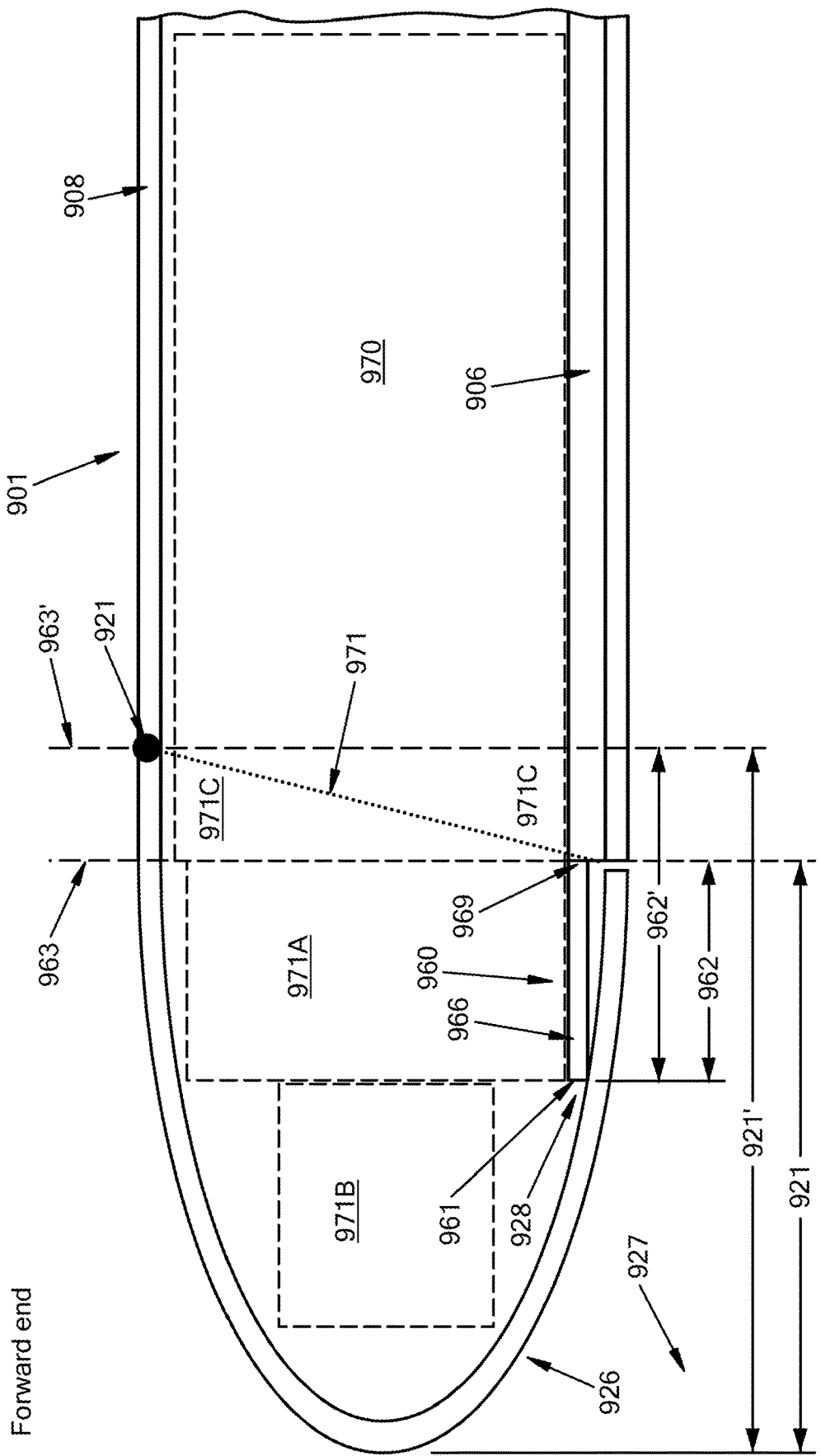
FIG. 9 is schematic illustration of the aircraft of FIG. 6A illustrating the cantilevered tongue in the nose cone door and the configuration of the cargo bay volumes in the nose cone door.

FIG. 9 is schematic illustration of a forward end of another embodiment of the aircraft 100 of FIG. 6A having an alternative design nose cone door and cantilevered tongue configuration. A fixed portion 908 of the fuselage 901 of FIG. 9 includes a cantilevered tongue 960 extending into a nose cone door 926 in a closed position, with the nose cone door 926 containing a configuration of two portions 971A, 971B, of a forward-most region (shown in the aircraft 100 of FIG. 6A as 175) a cargo bay 970 in the nose cone door 926, as defined by the geometry of the cantilevered tongue 960. In FIG. 9, a slanted cargo opening 971 is shown as being defined by a hinge 921 which articulates the nose cone door 926 forward of the hinge 921 and the cargo opening 971 extending downwards towards the cantilevered tongue 960. The vertical cargo opening 71 of FIG. 6A is merely one example of the possible geometrical interface between a nose cone door 126 and a fixed portion of the fuselage 128. Accordingly, the cargo opening 971 of FIG. 9 is shown at an angle to better illustrate that a length of the cantilevered tongue 960 can be defined either (i) a cantilevered length 962, which is the extension 926 of the cantilevered tongue 160 into the nose cone door 926, as measured is from an aft end 969 of the cantilevered tongue 960 (e.g., the vertical plane 963 where the cantilevered tongue 960 passes the threshold of the cargo opening 971) to a forward end 961 or (ii) an overall length 962', which is the forward longitudinal extension of forward end 961 of the cantilevered tongue 960 as measured from the vertical plane 963' of the location of the aft-most location of the nose cone door 926 (e.g., the location of the hinge 921). Accordingly, the forward-most region (175 of FIG. 6A) of the cargo bay 970 can includes an unsupported region 971B beyond the forward end 961 of the cantilevered tongue 960, a cantilevered region 971A along the longitudinal length 962 of the cantilevered tongue 960 inside the nose cone door 927, and a supported region 971C which is partially contained by the nose cone door 927. In some instances, either the cantilevered region 971A alone, or in combination with the supported region 971C is at least about 15% of the overall exterior volume of the forward end of the fuselage 908, as measured longitudinally from either (i) the aft-most plane 963' of the nose cone door (e.g., the volume along length 921') or (ii) the plane 963 of the aft end 969 of the cantilevered tongue 960.

In some instances, the cantilevered tongue 960 can be formed as a structural extension 966 of a longitudinal support structure 906 of the fixed portion 908 of the fuselage 901. Additionally, the forward end arrangement of FIG. 9 includes a cantilevered tongue support 928 configured to, when the nose cone door 926 is closed, support a portion of the forces on the cantilevered tongue 960 with the nose cone door 926.

Figure 10:
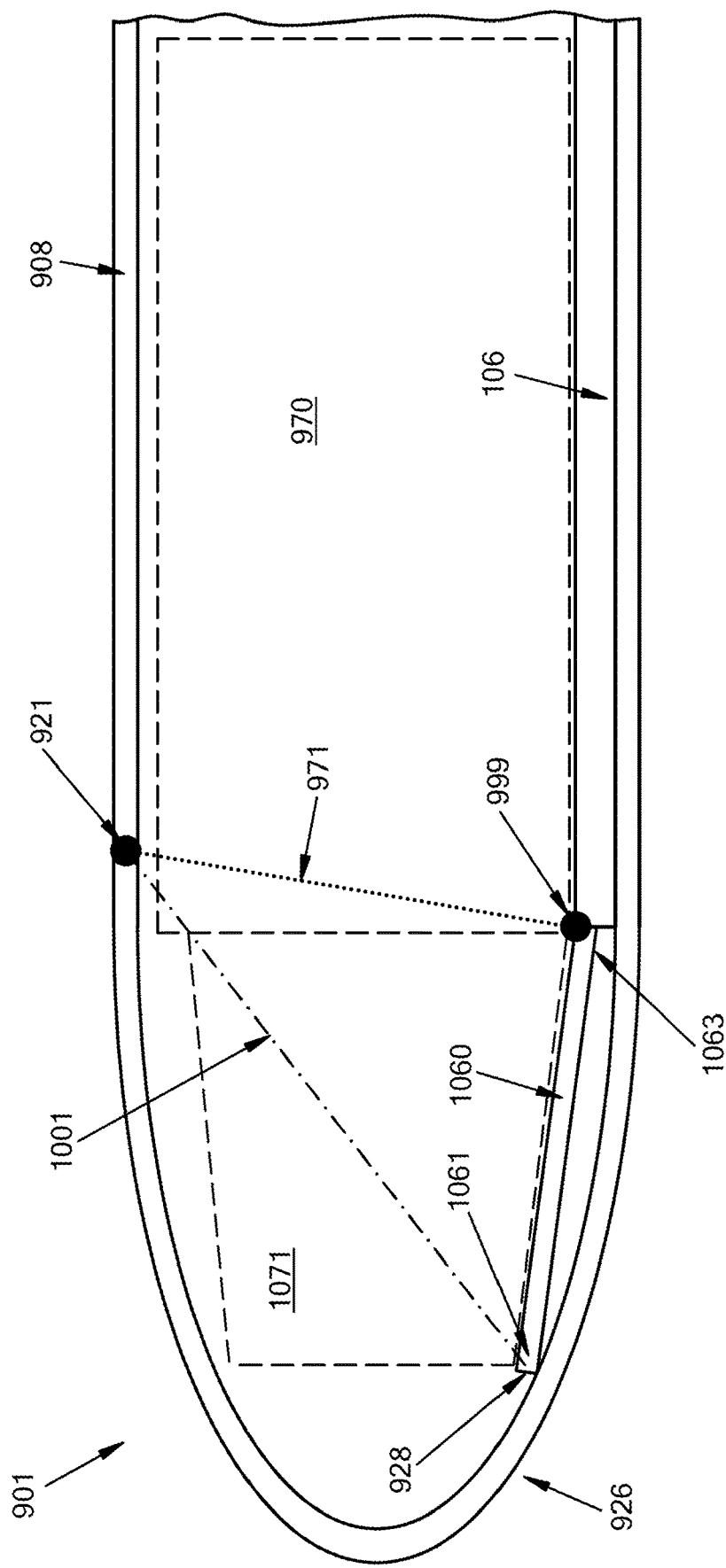
FIG. 10 is schematic illustration of the aircraft of FIG. 6A illustrating an alternate embodiment of the cantilevered tongue in the nose cone door.

FIG. 10 is schematic illustration of an alternate configuration of the forward end of the fuselage 901 the aircraft of FIG. 9 illustrating a hinged cantilevered tongue 1060 extending into the nose cone door 926. The hinged cantilevered tongue 1060 defines a portion 1071 of the forward-most cargo region (shown as 175 in FIG. 6A) of the cargo bay 970 that extends along the length of the hinged cantilevered tongue 1060 inside the nose cone door 926. The hinged cantilevered tongue 1060 is secured to the fixed portion 908 of the fuselage 901 by way of a hinge 999 at an aft end 1063 that enables the hinged cantilevered tongue 1060 to be stowed in the nose cone door 926 in a deflected position (as shown in FIG. 10) in order to extend the length of the hinged cantilevered tongue 1060 while preventing interference between the hinged cantilevered tongue 1060 and the nose cone door 926 during opening and closing of the nose cone door 926.

In some examples, and as shown in FIG. 10, the hinged cantilevered tongue 1060 can include one or more wire or cable supports 1001 along the hinged cantilevered tongue 1060 (e.g., at the forward end 1061) in order to assist in the hinged cantilevered tongue 1060 supporting the weight of the forward end of a payload during flight and/or a loading or unloading operation. In some instances, the wire or cable supports 1001 are adjustable in order to control the position of the hinged cantilevered tongue 1060. In an example operation, the hinged cantilevered tongue 1060 includes a forward terminal ends 191A, 191B of a lower support system 190A, 190B that is used during loading and unloading to initiate translation of payloads (e.g., using fixtures 12 traveling along the lower support system 190A, 190B) into the cargo bay 970. In this example operation, the position of the forward terminal ends 191A, 191B of the lower support system 190A, 190B can be positioned using adjustable wire or cable supports 1001 to position the hinged cantilevered tongue 1060 with respect to the hinge 999 at an angle that best facilitates the unloading or loading operation. Additionally, after a payload (e.g., payload 10 of FIG. 6B) is disposed in the cargo bay 170,970 with a forward fixture secured to the forward terminal ends 191A, 191B of the lower support system 190A, 190B, the adjustable wire or cable supports 1001 can assist in the raising of the hinged cantilevered tongue 1060 in order to provide clearance for the closing of the nose cone door 926. In some examples, after the nose cone door 926 is closed, the hinged cantilevered tongue 1060 can be fully or partially lowered in order to couple the hinged cantilevered tongue 1060 with a cantilevered tongue support 928, such that a combination of any one or more of the hinged cantilevered tongue 1060, the nose cone door 926, and the wire or cable supports 1001 supports some or all of a weight of the forward end of the payload on the hinged cantilevered tongue 1060.

Rails and Payload-Receiving Fixtures

Figure 11A:
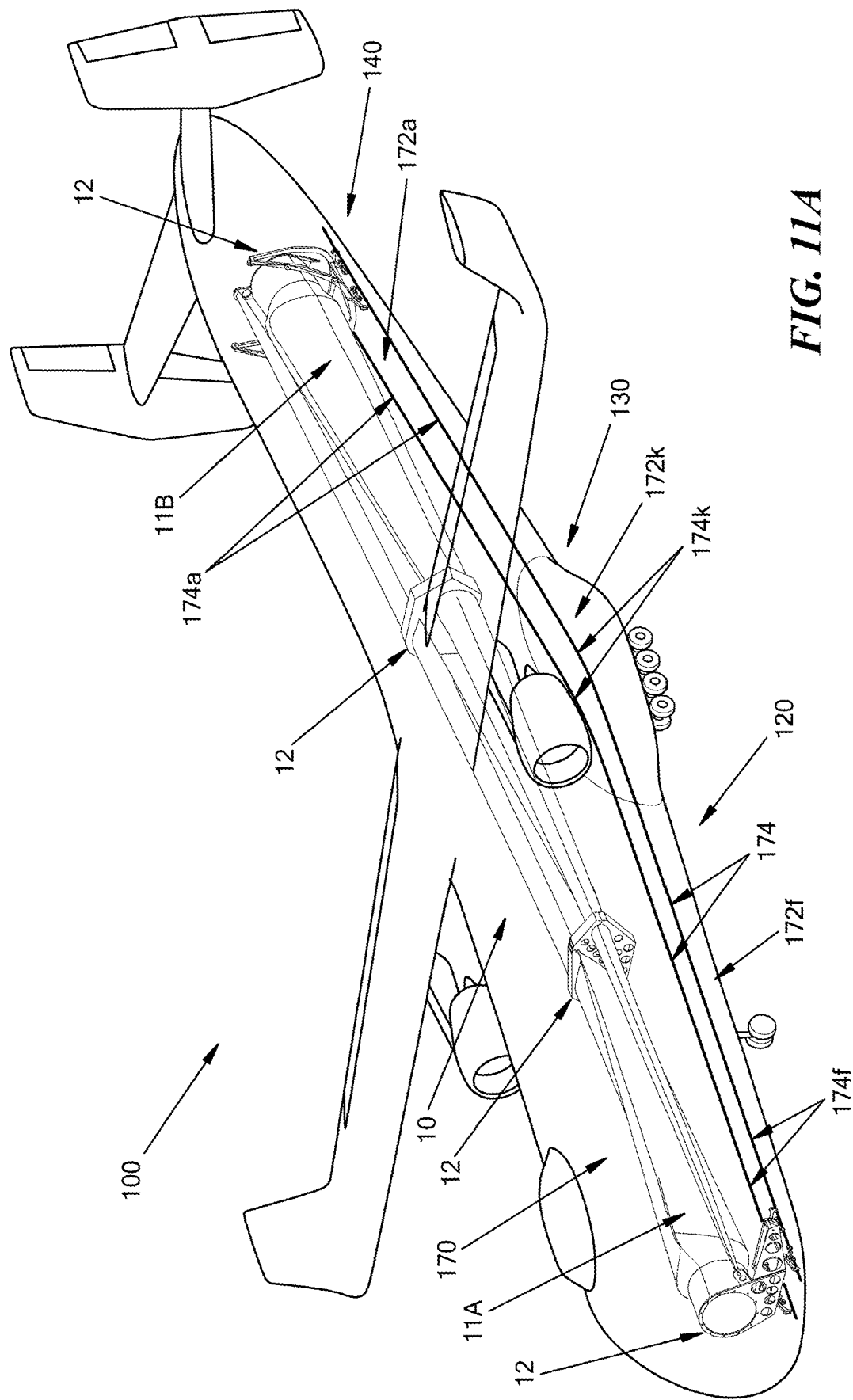
FIG. 11A is an isometric, transparent view of the aircraft of FIG. 1B having the payload disposed therein.
Figure 11B:
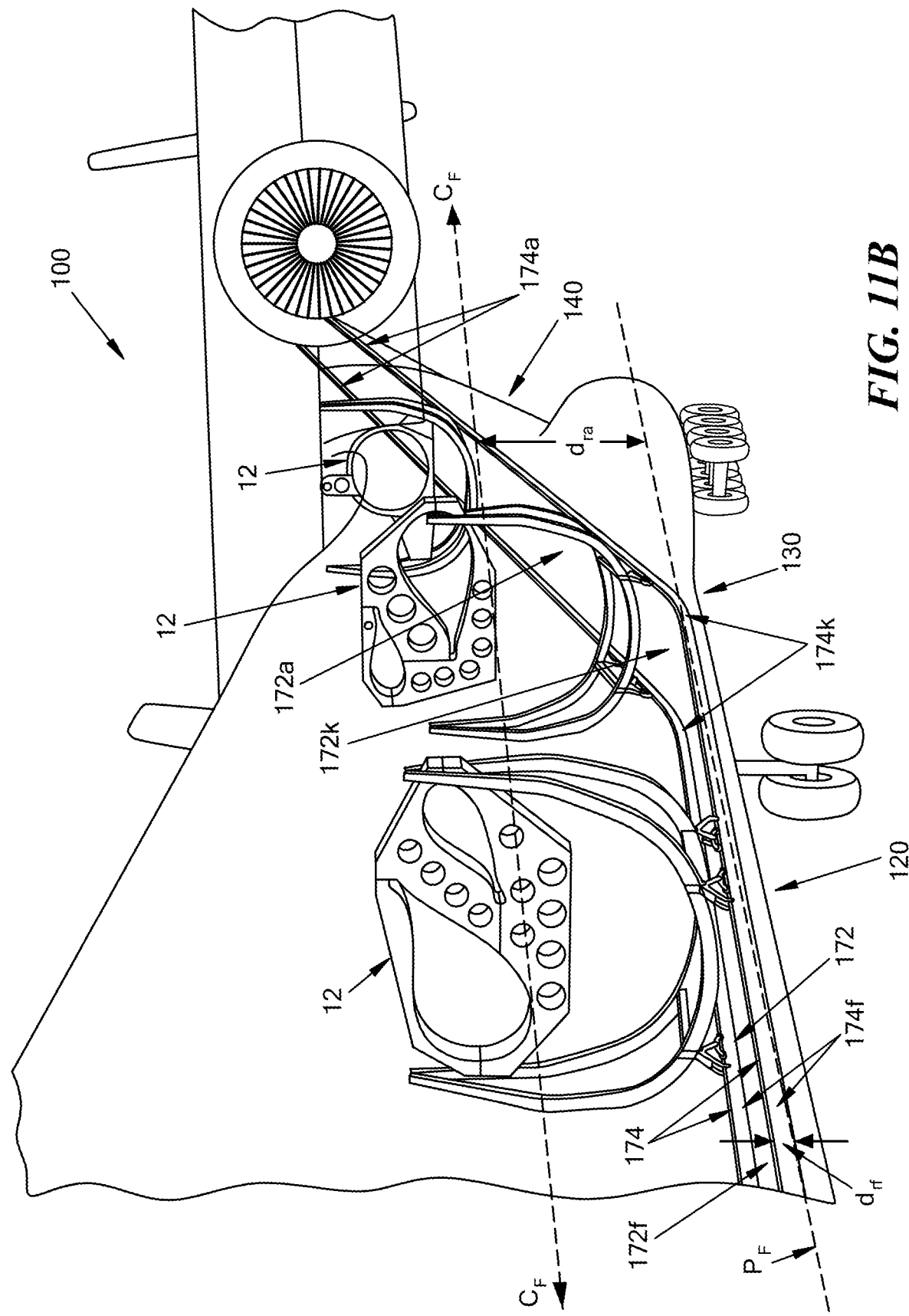
FIG. 11B is a detailed, front-side isometric, transparent view of the aircraft of FIG. 11A with wind turbine blades of the payload hidden from view to better illustrate a pair of rails disposed in the interior cargo bay and exemplary payload-receiving fixtures for holding the wind turbine blades coupled to the rails.
Figure 11C:
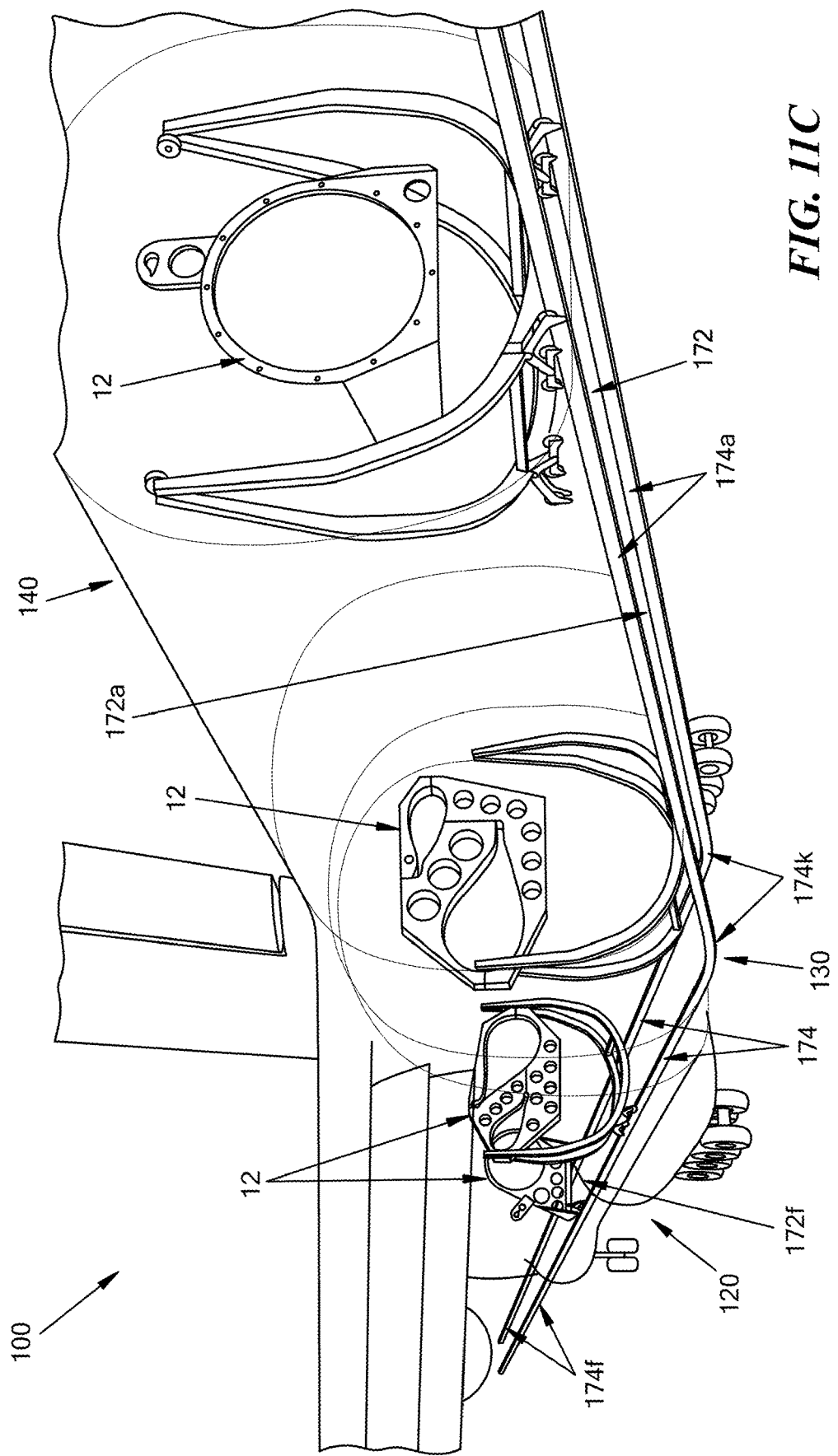
FIG. 11C is a detailed, back-side isometric, transparent view of the aircraft of FIG. 11B.

Hidden from view in the previous figures of the aircraft 100, but illustrated in FIGS. 11A-11C are a pair of rails 174 coupled to, extending from, or otherwise associated with the floor 172 of the cargo bay 170. Some of the illustrations may look incomplete or incompatible with other figures, such as having rails extending beyond what looks like the terminal end of a fixed portion of the fuselage (see, e.g., FIG. 11C as filed), but a person skilled in the art will recognize this is just the result of complications that can arise while drawing and viewing components using solid models and is not indicative of an incomplete, incompatible, or inoperable aspect of the aircraft and/or related components. A person skilled in the art, in view of the present disclosures, will understand how such components should be illustrated in view of the present disclosures and other figures.

Much like the bay 170 and the floor 172, the rails 174 can extend in a continuous manner from the forward end 120, through the kinked portion 130, and into the aft end 140. The rails 174 can thus be configured to have a forward end 174f, a kinked portion 174k, and an aft end 174a. As a result of the kinked portion 174k, a vertical distance $d_{ra}$ between the aft end 174a and a plane $P_F$ defined by an interior bottom contact surface of the interior cargo bay 170 in the forward end 120 of the aircraft 100, i.e., the plane $P_F$ extending longitudinally and laterally through the forward end 172f of the floor 172 and that is substantially parallel to the forward centerline $C_F$, is greater than a vertical distance $d_{rf}$ between at least a portion of the forward end 174f and the plane $P_F$. Further, in some embodiments in which the aft end 140 extends above a plane extending substantially through an entirety of the top surface 102 of the forward end 120 of the fuselage 101 such that the plane is substantially parallel to ground, because the rails 174 can extend towards and into the tail 142, a portion of at least one of the rails 174, as shown both rails 174, disposed in the aft bay portion 172a can also be located above the plane extending substantially through an entirety of the top surface 102 of the forward end 120 of the fuselage 101. The angle at which the rails 174 are disposed in the aft bay portion 170a can be akin to the kink angle $\alpha_K$. More generally, the rails 174 can extend in a manner such that a majority of it disposed in the aft bay portion 170a is disposed at the kink angle $\alpha_K$. As shown, there are two rails 174 that are substantially parallel to each other across their length, but in other embodiments there can be fewer (e.g., one rail) or more rails and the rails can extend in non-parallel manner, such as having them angle closer together or further apart slightly as they extend towards the aft end 140 to create a desired stopping location that works with fixtures loaded onto the rails 174. In some embodiments, the rail(s) 174 can serve as a primary structural member(s) or beam(s) of the fuselage 101, capable of bearing operational flight and/or ground loads, akin to a keel beam in some aircraft.

A payload, such as the payload 10, can be translated along the rails 174 from the forward end 174f and towards the aft end 174a until the payload reaches a desired location. That desired location can relate, for example, to placing a center of gravity of the payload within a desired range of a center of gravity of the aircraft. Translation of the payload can be aided by the fixtures 12 illustrated in FIGS. 11A-12. As shown best in FIG. 12, the fixtures 12 can have a variety of configurations that are configured to both receive a payload, such as wind turbine blades 11A, 11B (of fewer or more blades as desired) and translate along the rails 174 to place the payload at the desired location(s).

The payload-receiving fixtures 12, as shown fixtures 112, 212, 312, 412, can generally include a carriage 114, 114' a frame 116, and a receiver 118, 218, 318, 418. In at least some of the illustrated embodiments, a single type of carriage and a single type of frame are provided, while four different receivers are illustrated. A person skilled in the art will recognize other carriages, frames, and receivers that can be used in conjunction with the present disclosures. Further, while payload-receiving fixtures are referred to herein using reference numeral 12, in some embodiments, a payload-receiving fixture may just be a receiver, like the receivers 118, 218, 318, 418, and thus such usage of the term "payload-receiving fixture" herein, including in the claims, can be directed to just a receiver as provided for herein. Generally that term in any claim should be read in that manner, unless such interpretation would be incompatible with the remaining portion of the claim, for example, if the claim separately recites a receiver.

Some of the illustrations may look incomplete or incompatible with other figures, such as looking like a receiver is not quite properly coupled to a frame (see, e.g., FIGS. 11B, 11C, and 12 as filed) or the fixture 12 not being in contact with the rails 174 (see, e.g., FIG. 12), but a person skilled in the art will recognize this is just the result of complications that can arise while drawing and viewing components using solid models and is not indicative of an incomplete, incompatible, or inoperable aspect of the aircraft and/or related components. A person skilled in the art, in view of the present disclosures, will understand how such components should be illustrated in view of the present disclosures and other figures.

Figure 12:
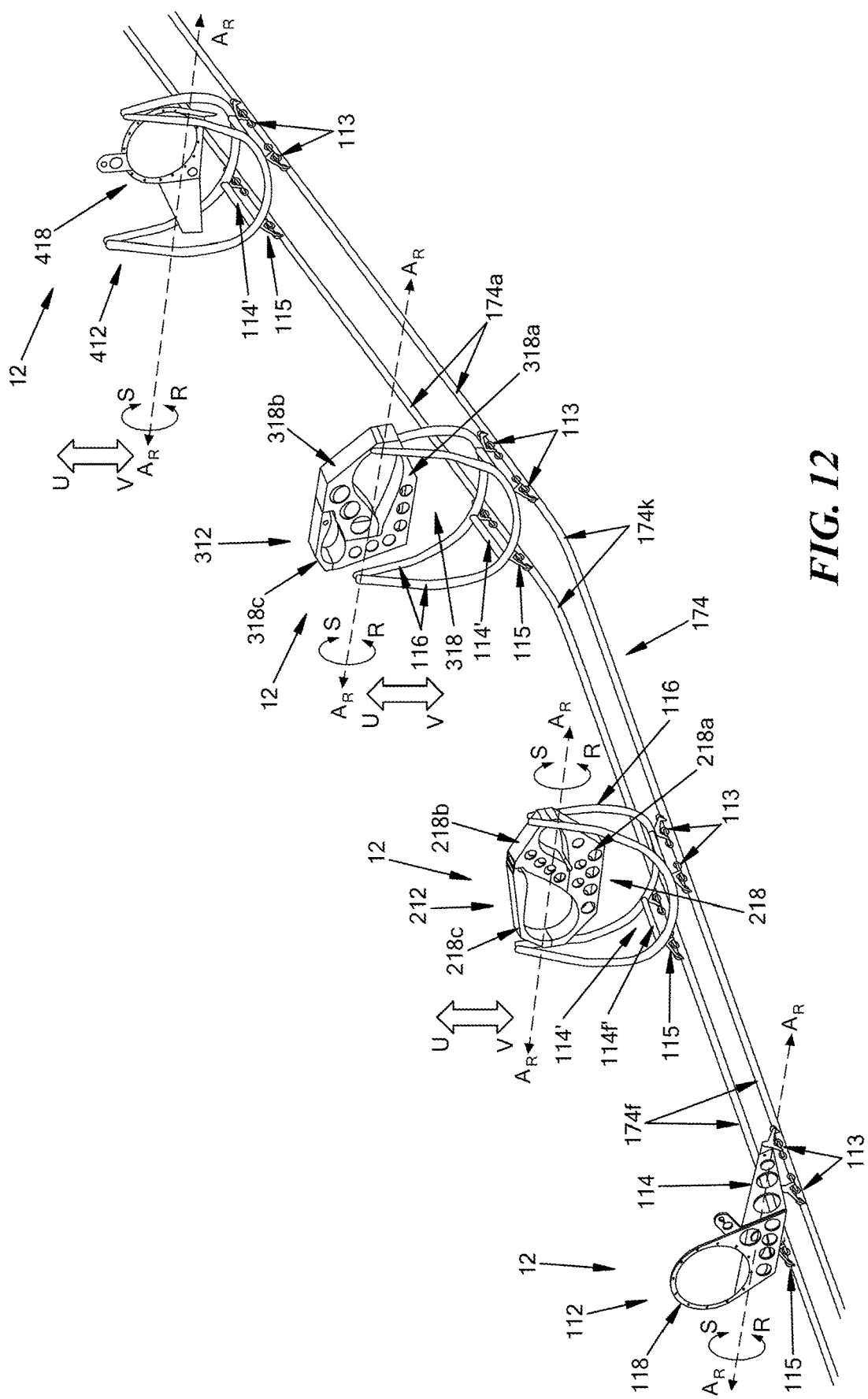
FIG. 12 is an isometric view of the rails and payload-receiving fixtures of FIG. 7B.

As shown in FIG. 12, a first payload-receiving fixture 112 includes a carriage 114 having a plurality of wheel sets 113 associated therewith. Each wheel set 113 is part of a whiffle tree 115 that extends from the carriage 114 to couple the wheels of the wheel sets 113 to the carriage 114. A receiver 118 is coupled to the carriage 114. The receiver 118 includes a plurality of holes or openings (these words may be used interchangeably herein) that can be used to receive a wind turbine blade. In the illustrated embodiment, the receiver 118 is designed to be a terminal end payload-receiving fixture with the largest opening configured to receive a base of a wind turbine blade and one or more of the other openings configured to receive a tip of a second blade. The other openings disposed in the receiver 118 can also make the fixture 112 lighter in weight, making it more suitable for flying, and/or can be used in conjunction with securing a location of the payload within the cargo bay. In alternative embodiments, a frame, like the frame 116, can be used to couple the fixture 112 to the carriage 114.

A second payload-receiving fixture 212 provided for in FIG. 12 includes a carriage 114', wheel sets 113, and whiffle trees 115, each of which are the same as discussed above with respect to the carriage 114, wheel sets 113, and whiffle trees 115, except for slight differences between the carriages 114', 114. More particularly, a frame 116 is incorporated into the carriage 114', supporting the receiver 218. Any known techniques for mounting or otherwise integrating the frame 116 to the carriage 114' can be employed, whether provided for herein or otherwise known to those skilled in the art. In the illustrated embodiment the frame 116 replaces two bars of the frame 114*f* of the carriage 114'. A person skilled in the art will recognize that other means for translation can be used in lieu of or in addition to wheels and wheel sets in any of these embodiments, including but not limited to skis, skids, linked tracks (e.g., tractor tracks, military tank tracks), articulated legs, air cushions in the manner of a hovercraft, or other structures that allow for translation between two structures. Generally, any of the fixtures provided for in the present disclosure can translate along the rail(s) 174, with rolling and sliding being interchangeably used and more generally being considered translation or advancement of the fixture. The receiver 218 is adapted for receiving wind turbine blades. More particularly, the receiver 218 is designed as an intermediate fixture to receive an intermediate portion(s) of a wind turbine blade(s). For example, the two largest openings can be configured to receive portions of two wind turbine blades, and additional openings or holes can serve a similar purpose as the openings of the receiver 118. The illustrated receiver 218 is configured in a manner that it has multiple pieces, as shown three 218*a*, 218*b*, and 218*c*, that can couple together, for instance by snap-fitting together, to secure a location of the blades with respect to the receiver 218 and/or other blades received by the receiver 218.

A third payload-receiving fixture 312 provided for in FIG. 12 is mainly akin to the second fixture 212, including the carriage 114', wheel sets 113, whiffle trees 115, and frame 116, as well as a receiver 318 that is adapted for receiving wind turbine blades along intermediate portions of the blades. Like the second receiver 218, the two largest openings or holes of the third receiver 318 can be configured to receive intermediate portions of two wind turbine blades. The largest openings, and other openings, are positioned differently in the third receiver 318, but the intended purposes and uses of the same are akin. Further, like the second receiver 218, the third receiver 318 is designed to secure a location of the blades with respect to itself and/or other blades received by the receiver 318 by way of multiple pieces, as shown pieces 318*a*, 318*b*, and 318*c*, that couple together.

A fourth payload-receiving fixture 412 provided for in FIG. 12 is more akin to the first fixture 112 as it is also designed to be a terminal end receiving fixture. Its largest opening or hole can be configured to receive a base of a wind turbine blade and one or more of the other openings or holes can be configured to receive a tip of a second blade and/or serve other purposes as provided for above. The fourth fixture 412 utilizes the carriage 114' and frame 116 of the fixtures 212 and 312. For each of the first and fourth receivers 118 and 418, a base of a wind turbine blade can be coupled to the respective structure 118, 418 by way of bolting it thereto using the bolt holes disposed around a circumference of the largest opening. A person skilled in the art will recognize other ways by which a blade(s) can be coupled to any of the receivers 118, 218, 318, or 418 provided for herein.

Further, while in the illustrated embodiments the receivers 118, 218, 318, or 418 are generally designed to hold two wind turbine blades, a person skilled in the art will recognize those receivers, or other receivers, can be configured to hold other numbers of wind turbine blades, including one, three, four, five, or even more. As designed, the fixtures 12 and blades 11A, 11B, 11C, 11D can be packaged in a repetitive, repeatable manner, thus allowing for the center of gravity of the payload to be consistent across packaged payloads. Such packaging can be done in a manner that provides a compact volume of the irregular payload. Still further, while the fixtures 112, 212, 312, 412 are illustrated for use in conjunction with wind turbine blades, a person skilled in the art will recognize such fixtures can be used, re-designed, adapted, etc. for use with other large structures, including but not limited to industrial oil equipment, mining equipment, rockets, military equipment and vehicles, commercial aerospace vehicles, crane segments, aircraft components, space launch rocket boosters, helicopters, generators, or hyperloop tubes. Additionally, the various fixtures 112, 212, 312, 412, as well as other configurations of fixtures and/or components of the fixtures (e.g., carriages like the carriage 114, 114', frames like the frame 116, receivers like the receivers 118, 218, 318, 418, etc.) can be provided as a packaging kit to allow for the various fixtures and/or their components to be selected for particular uses, designs, and functions in a plug-and-play manner. The fixtures themselves can be pre-designated for particular structures (e.g., wind turbine blades) and/or particular locations with respect to such structures (e.g., a terminal end, an intermediate—possibly designated—position).

As the fixtures 12 travel along the rails 174, some or all of them can be adapted to rotate and/or translate to enable desirable handling during travel. By way of example, all four of the fixtures 12 can be configured to rotate in directions R and S about a pivot axis $A_R$ of each of the fixtures 12, while at least the fixtures 12 that pass through along the kinked portion 174p of the rail 174 can be configured to translate vertically, up-and-down with respect to the rail 174 as shown by in directions U and V. Such movements can be achieved using known techniques for causing rotational and translational actuation, including but not limited to hydraulics, pistons, hydraulic pistons, pulleys-and-cables, and air chambers, among others. Further, such movements can be selectively active or passive. For example, with respect to an active movement, one or more of the fixtures 12 and/or the payload (it is noted that the payload can be interpreted to include or not include the fixtures as appropriate) can be monitored, for instance by a location and/or pressure sensor, and in response to one or more designated parameters or other cues (e.g., visual, tactile), action can be taken to rotate or vertically translate the fixture(s) 12 as desired. The input to take the action can be manual, e.g., by a person, or automated, by a program that acts in response to the designated parameter(s). Alternatively, or additionally, with respect to passive movement, one or more of the fixtures 12 can be designed to automatically mechanically rotate or vertically translate as a result of a change in conditions, such as translating the fixture(s) 12 and payload along the rails 174. In this type of instance, certain movements, such as part of the payload rising up as it becomes disposed in the aft bay portion 170a, may cause one or more fixtures to rotate and/or vertically translate.

Additional details about tooling for cargo management, including rails and payload-receiving fixtures, are provided in a counterpart patent application entitled "SYSTEMS AND METHODS FOR LOADING AND UNLOADING A CARGO AIRCRAFT," filed concurrently herewith, the content of which is incorporated by reference herein in its entirety.

One skilled in the art will appreciate further features and advantages of the disclosures based on the provided for descriptions and embodiments. Accordingly, the inventions are not to be limited by what has been particularly shown and described. For example, although the present disclosure provides for transporting large cargo, such as wind turbines, the present disclosures can also be applied to other types of large cargos or to smaller cargo. All publications and references cited herein are expressly incorporated herein by reference in their entirety.

Examples of the above-described embodiments can include the following:

1. A cargo aircraft, comprising:
    a fuselage defining a forward end, an aft end, and an interior cargo bay that spans a majority of a length of the fuselage from the forward end to the aft end, the fuselage including:
        a fixed portion defining a first region of the interior cargo bay, the fixed portion extending aft from a cargo opening;
        an articulating nose cargo door defining a second region of the interior cargo bay and configured to move between an open position and a closed position such that, in the closed position, the articulating nose cargo door forms a closed forward end of the fuselage and in the open position the articulating nose cargo door is moved to expose the cargo opening into the first region of the interior cargo bay; and
        a cantilevered support structure extending forward a length from the cargo opening in the fixed portion and towards the articulating nose cargo door when the articulating nose cargo door is in the closed position,
    wherein, in the closed position, the cantilevered support structure is disposed inside the articulating nose cargo door such that the length of the cantilevered support structure defines a longitudinal length of the second region of the interior cargo bay, and|
    wherein the second region of the interior cargo bay has a cargo volume along the longitudinal length of the second region of at least about 15% of the overall volume of the fuselage forward of an aft end of the cantilevered support structure, the aft end of the cantilevered support structure being an intersection of the cantilevered support structure and the cargo opening.

2. The cargo aircraft of claim 1,
    wherein the cargo volume of the second region is approximately in the range of about 15% to about 25% of the overall volume of the fuselage forward of the aft end of the cantilevered support structure.

3. The cargo aircraft of claims 1 or 2,
    wherein the cantilevered support structure is fixed with respect to the fixed portion of the fuselage.

4. The cargo aircraft of claims 1 or 2,
    wherein at least a portion of the cantilevered support structure is configured to rotate about a lateral axis with respect to the fixed portion of the fuselage.

5. The cargo aircraft of any of claims 1 to 4,
    wherein the cantilevered support structure is configured to be partially supported by the articulating nose cargo door when the articulating nose cargo door is in the closed position.

6. The cargo aircraft of any of claims 1 to 5,
    wherein the cantilevered support structure comprises an exterior surface portion of the fuselage that extends along a portion of the length of the articulating nose cargo door in the closed position.

7. The cargo aircraft of any of claims 1 to 6,
    wherein the fixed portion of the fuselage comprises a lower support surface defining an interior cargo deck of the interior cargo volume, and
    wherein the cantilevered support structure comprises an upper surface defining a portion of the interior cargo deck.

8. The cargo aircraft of claim 7,
wherein the lower support surface of the fixed portion of the fuselage abuts the upper surface of the cantilevered support structure, and
wherein the fixed portion of the fuselage comprises one or more structural keel beams extending along at least a portion of the length of the cantilevered support structure, such that that the one or more structural keel beams are configured to support at least a portion of the lower support surface of the fixed portion of the fuselage and the upper surface of the cantilevered support structure.

9. The cargo aircraft of claim 7,
wherein the fixed portion of the fuselage comprises a longitudinal support structure extending along at least a majority of the first region, and
wherein the cantilevered support structure comprises a forward extension of the longitudinal support structure.

10. The cargo aircraft of any of claims 1 to 8,
wherein the articulating nose cargo door defines an effective length along a longitudinal axis of the forward end of the fuselage, the effective length extending from the aft end of the cantilevered support structure to the forward nose of the aircraft, and
wherein the length of the cantilevered support structure is at least approximately 25% of the effective length of the articulating nose cargo door.

11. The cargo aircraft of claim 10,
wherein the length of the cantilevered support structure is between approximately in the range of about 25% to about 50% of the effective length of the articulating nose cargo door.

12. The cargo aircraft of claim 10,
wherein the length of the cantilevered support structure is at least approximately 3% of a maximum payload length of the interior cargo bay.

13. The cargo aircraft of claim 12,
wherein the length of the cantilevered support structure is at least approximately 8 feet.

14. The cargo aircraft of claim 12,
wherein the interior cargo bay is configured to contain a payload having the maximum payload length and a maximum payload weight, and
wherein the cantilevered support structure is configured to support a weight fraction of the maximum payload weight that is larger than a length fraction of the length of the cantilevered support structure with respect to the maximum payload length.

15. The cargo aircraft of any of claims 1 to 14, wherein the second region defines a maximum diameter of at least approximately 15 feet.

16. The cargo aircraft of claim 14,
wherein the cantilevered support structure is configured to support at least approximately 5% of the maximum payload weight across the length of the cantilevered support structure.

17. The cargo aircraft of claim 14,
wherein the cantilevered support structure is configured to support at least approximately 20% of the maximum payload weight.

18. The cargo aircraft of claim 14,
wherein the cantilevered support structure is configured to support at least approximately 5% of the maximum payload weight at a forward terminal end of the cantilevered support structure.

19. The cargo aircraft of any of claims 1 to 18,
wherein the first and second regions of the interior cargo bay together define a maximum cargo carrying length of the interior cargo bay of at least about 250 feet.

20. The cargo aircraft of any of claims 1 to 19,
wherein the fuselage further comprises a nose defining a non-constant cross section of the forward end of the fuselage, and
wherein the articulating nose cargo door comprises at least a forward-most portion of the nose.

21. The cargo aircraft of claim 20,
wherein the articulating nose cargo door further comprises at least an aft-most portion of the nose.

22. A method of loading a highly elongated payload onto a cargo aircraft, the method comprising:
opening an articulating nose cargo door of a forward end of a cargo aircraft, the opened articulating nose cargo door exposing an opening into an interior cargo bay of the cargo aircraft that spans a majority of the length of the fuselage of the aircraft from the forward end and to an aft end;
disposing the highly elongated payload into the interior cargo bay of the cargo aircraft, the highly elongated payload being at least partially supported by a cantilevered support structure extending forward a length from the opening and towards the articulating nose cargo door when the articulating nose cargo door closed; and
holding an entirety of the highly elongated payload in the interior cargo bay when the an articulating nose cargo door is closed such that at least a portion of the highly elongated payload is disposed in a region of the interior cargo bay defined by the length of the cantilevered support structure,
wherein the region of the interior cargo bay has a cargo volume along the longitudinal length of the region of at least about 15% of the overall volume of the fuselage forward of an aft end of the cantilevered support structure by the cantilevered support structure.

23. The method of claim 22,
wherein holding an entirety of the highly elongated payload in the interior cargo bay includes the cantilevered support structure carrying at least a portion of the length and weight of the highly elongated payload, and
wherein the fraction of the weight of the highly elongated payload carried by the cantilevered support structure is higher than a fraction of the length of the cantilevered support structure to a length of the highly elongated payload.

24. The method of claim 22 or 23,
wherein the cargo volume of the region of the interior cargo bay defined by the length of the cantilevered support structure is approximately in the range of about 15% to about 25% of the overall volume of the fuselage forward of an aft end of the cantilevered support structure.

25. The method of claims 22 to 24,
wherein the cargo volume of the region of the interior cargo bay defined by the length of the cantilevered support structure defines a maximum diameter of at least approximately 15 feet.

26. The method of claims 22 to 25,
wherein the articulating nose cargo door defines an effective length along a longitudinal axis of the forward end of the fuselage, the effective length extending from the aft end of the cantilevered support structure to the forward nose of the aircraft, and wherein the length of the cantilevered support structure is at least approximately 25% of the effective length of the articulating nose cargo door.

27. The method of any of claims 22 to 26,
wherein the fuselage comprises a longitudinal support structure extending along at least a majority fuselage aft of the opening, and
wherein the cantilevered support structure comprises a forward extension of the longitudinal support structure 28. A cargo aircraft, comprising:
a fuselage defining a forward end, an aft end, and an interior cargo bay that spans a majority of a length of the fuselage from the forward end to the aft end, the fuselage including:
a fixed portion defining a first region of the interior cargo bay, the fixed portion extending aft from a cargo opening;
an articulating nose cargo door defining a second region of the interior cargo bay and configured to move between an open position and a closed position such that, in the closed position, the articulating nose cargo door forms a closed forward end of the fuselage and in the open position the articulating nose cargo door is moved to expose the cargo opening into the first region of the interior cargo bay; and
a cantilevered support structure extending forward a length from the cargo opening in the fixed portion and towards the articulating nose cargo door when the articulating nose cargo door is in the closed position,
wherein, in the closed position, the cantilevered support structure is disposed inside the articulating nose cargo door such that the length of the cantilevered support structure defines a longitudinal length of the second region of the interior cargo bay,
wherein the interior cargo bay is configured to hold a payload having a maximum payload length and a maximum payload weight,
wherein the length of the cantilevered support structure is at least approximately 3% of the maximum payload length of the interior cargo bay, and
wherein a forward end of the cantilevered support structure is configured to support a weight fraction of the maximum payload weight that is larger than a length fraction of the length of the cantilevered support structure with respect to the maximum payload length.

What is claimed is:

1. A cargo aircraft, comprising:
a fuselage defining a forward end, an aft end, and an interior cargo bay that spans a majority of a length of the fuselage from the forward end to the aft end, the fuselage including:
a fixed portion defining a first region of the interior cargo bay, the fixed portion extending aft from a cargo opening;
an articulating nose cargo door at least partially containing a second region of the interior cargo bay that extends forward from a forward end of the first region, the articulating nose cargo door configured to move between an open position and a closed position such that, in the closed position, the articulating nose cargo door forms a closed forward end of the fuselage and in the open position the articulating nose cargo door is moved to expose the cargo opening into the first region of the interior cargo bay; and
a cantilevered support structure extending forward a length from the cargo opening in the fixed portion and towards the articulating nose cargo door when the articulating nose cargo door is in the closed position,
wherein, in the closed position, the cantilevered support structure is disposed inside the articulating nose cargo door such that the length of the cantilevered support structure defines a longitudinal length of the second region of the interior cargo bay,
wherein, in the closed position, the cantilevered support structure is configured to at least partially carry a weight of a payload disposed in both the first and second regions of the interior cargo bay, and
wherein, in the closed position, the cantilevered support structure is configured to be partially supported by the articulating nose cargo door.

2. The cargo aircraft claim 1,
wherein the cantilevered support structure is fixed with respect to the fixed portion of the fuselage.

3. The cargo aircraft of claims 1,
wherein at least a portion of the cantilevered support structure is configured to rotate about a lateral axis with respect to the fixed portion of the fuselage.

4. The cargo aircraft of claim 1,
wherein the cantilevered support structure comprises an exterior surface portion of the fuselage that extends along a portion of the length of the articulating nose cargo door in the closed position.

5. The cargo aircraft of claim 1,
wherein the fixed portion of the fuselage comprises a lower support surface defining an interior cargo deck of the interior cargo volume, and
wherein the cantilevered support structure comprises an upper surface defining a portion of the interior cargo deck.

6. The cargo aircraft of claim 5,
wherein the lower support surface of the fixed portion of the fuselage abuts the upper surface of the cantilevered support structure, and
wherein the fixed portion of the fuselage comprises one or more structural keel beams extending along at least a portion of the length of the cantilevered support structure, such that that the one or more structural keel beams are configured to support at least a portion of the lower support surface of the fixed portion of the fuselage and the upper support surface of the cantilevered support structure.

7. The cargo aircraft of claim 5,
wherein the fixed portion of the fuselage comprises a longitudinal support structure extending along at least a majority of the first region, and
wherein the cantilevered support structure comprises a forward extension of the longitudinal support structure.

8. The cargo aircraft of claim 1,
wherein the articulating nose cargo door defines an effective length along a longitudinal axis of the forward end of the fuselage, the effective length extending from an aft end of the cantilevered support structure to the forward end of the aircraft, and
wherein the length of the cantilevered support structure is at least approximately 25% of the effective length of the articulating nose cargo door.

9. The cargo aircraft of claim 8,
wherein the length of the cantilevered support structure is between approximately in the range of about 25% to about 50% of the effective length of the articulating nose cargo door.

10. The cargo aircraft of claim 8,
wherein the length of the cantilevered support structure is at least approximately 3% of a maximum payload length of the interior cargo bay.

11. The cargo aircraft of claim 10,
wherein the length of the cantilevered support structure is at least approximately 8 feet.

12. The cargo aircraft of claim 10,
wherein the interior cargo bay is configured to contain a payload having the maximum payload length and a maximum payload weight, and
wherein the cantilevered support structure is configured to support a weight fraction of the maximum payload weight that is larger than a length fraction of the length of the cantilevered support structure with respect to the maximum payload length.

13. The cargo aircraft claim 1, wherein the second region defines a maximum diameter of at least approximately 15 feet.

14. The cargo aircraft of claim 1,
wherein the first and second regions of the interior cargo bay together define a maximum cargo carrying length of the interior cargo bay of at least about 250 feet.

15. The cargo aircraft of claim 1,
wherein the fuselage further comprises a nose defining a non-constant cross section of the forward end of the fuselage, and
wherein the articulating nose cargo door comprises at least a forward-most portion of the nose.

16. A method of loading a highly elongated payload onto a cargo aircraft, the method comprising:
opening an articulating nose cargo door of a forward end of a cargo aircraft, the opened articulating nose cargo door exposing an opening into an interior cargo bay of the cargo aircraft that spans a majority of the length of the fuselage of the aircraft from the forward end and to an aft end;
disposing the highly elongated payload into the interior cargo bay of the cargo aircraft, the highly elongated payload being at least partially supported by a cantilevered support structure extending forward a length from the opening and towards the articulating nose cargo door when the articulating nose cargo door is in a closed position; and
holding an entirety of the highly elongated payload in the interior cargo bay when the articulating nose cargo door is in the closed position such that at least a portion of the highly elongated payload is disposed in a region of the interior cargo bay defined by the length of the cantilevered support structure,
wherein, in the closed position, the cantilevered support structure at least partially carries a weight of the highly elongated payload and the cantilevered support structure is at least partially supported by the articulating nose cargo door such that at least a portion of the weight carried by the cantilevered support structure is directed to the articulating nose cargo door.

17. The method of claim 16,
wherein holding an entirety of the highly elongated payload in the interior cargo bay includes the cantilevered support structure carrying at least a portion of the length and weight of the highly elongated payload, and
wherein the fraction of the weight of the highly elongated payload carried by the cantilevered support structure is higher than a fraction of the length of the cantilevered support structure to a length of the highly elongated payload.

18. A cargo aircraft, comprising:
a fuselage defining a forward end, an aft end, and an interior cargo bay that spans a majority of a length of the fuselage from the forward end to the aft end, the fuselage including:
a fixed portion defining a first region of the interior cargo bay, the fixed portion extending aft from a cargo opening;
an articulating nose cargo door at least partially containing a second region of the interior cargo bay that extends forward from a forward end of the first region, the articulating nose cargo door configured to move between an open position and a closed position such that, in the closed position, the articulating nose cargo door forms a closed forward end of the fuselage and in the open position the articulating nose cargo door is moved to expose the cargo opening into the first region of the interior cargo bay, and comprising a cantilevered tongue support; and
a cantilevered support structure extending forward a length from the cargo opening in the fixed portion and towards the articulating nose cargo door when the articulating nose cargo door is in the closed position,
wherein, in the closed position, the cantilevered support structure is disposed inside the articulating nose cargo door such that the length of the cantilevered support structure defines a longitudinal length of the second region of the interior cargo bay,
wherein, in the closed position, the cantilevered support structure is configured to couple with the cantilevered tongue support of the articulating nose cargo door such that, when coupled, the cantilevered support structure directs at least a portion of a payload weight carried by the cantilevered support structure to the articulating nose cargo door via the cantilevered tongue support.

19. The cargo aircraft of claim 18, wherein the interior cargo bay is configured to hold a payload having a maximum payload length and a maximum payload weight,
wherein the length of the cantilevered support structure is at least approximately 3% of the maximum payload length of the interior cargo bay, and
wherein a forward end of the cantilevered support structure is configured to support a weight fraction of the maximum payload weight that is larger than a length fraction of the length of the cantilevered support structure with respect to the maximum payload length.

* * * * *